US010373002B2

(12) United States Patent
Kwant et al.

(10) Patent No.: US 10,373,002 B2
(45) Date of Patent: Aug. 6, 2019

(54) METHOD, APPARATUS, AND SYSTEM FOR A PARAMETRIC REPRESENTATION OF LANE LINES

(71) Applicant: HERE Global B.V., Eindhoven (NL)

(72) Inventors: Richard Kwant, Oakland, CA (US); Anish Mittal, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 71 days.

(21) Appl. No.: 15/476,347

(22) Filed: Mar. 31, 2017

(65) Prior Publication Data

US 2018/0285659 A1 Oct. 4, 2018

(51) Int. Cl.
G06K 9/00 (2006.01)
G06K 9/46 (2006.01)
G06T 7/11 (2017.01)

(52) U.S. Cl.
CPC ....... *G06K 9/00798* (2013.01); *G06K 9/4633* (2013.01); *G06K 9/4638* (2013.01); *G06T 7/11* (2017.01); *G06T 2207/20021* (2013.01)

(58) Field of Classification Search
None
See application file for complete search history.

(56) References Cited

U.S. PATENT DOCUMENTS 9,171,485 B2 10/2015 Gautama et al.
2006/0078205 A1 4/2006 Porikli et al.
2009/0138188 A1* 5/2009 Kores ................ G01C 21/32
701/117
2012/0072080 A1 3/2012 Jeromin et al.
2016/0221592 A1 8/2016 Puttagunta et al.
2018/0304891 A1* 10/2018 Heidenreich ...... G01C 21/3602

OTHER PUBLICATIONS

Huang, "Lane Estimation for Autonomous Vehicles Using Vision and Lidar", Feb. 2010, pp. 1-114.
Lee, "Vector-based Ground Surface and Object Representation Using Cameras", 2009, 153 Pages.
Durrant-Whyte et al., "Simultaneous Localization and Mapping (SLAM): Part I", IEEE Robotics & Automation Magazine, vol. 13, Issue 2, Jun. 2006, pp. 99-108 Pages.

(Continued)

*Primary Examiner* — Idowu O Osifade
(74) *Attorney, Agent, or Firm* — Ditthavong & Steiner, P.C.

(57) ABSTRACT

An approach is provided for parametric representation of lane lines. The approach involves segmenting an input image into grid cells. The approach also involves processing a portion of the input image in each grid cell to detect lane lines. The approach further involves, for each grid cell in which lane lines are detected, determining intercepts of the lane lines with edges of the grid cell, and slopes of the lane lines at the intercepts. The approach further involves generating a parametric representation of the lane lines for each grid cell. The parametric representation encodes the intercepts and slopes into a data structure for each grid cell. The approach further involves providing an output parametric representation for the input image that aggregates the parametric representations of each grid cell.

20 Claims, 20 Drawing Sheets

(56) References Cited

OTHER PUBLICATIONS

Lowe, "Object Recognition from Local-Scale-Invariant Features", Proceedings of the International Conference on Computer Vision, Sep. 1999, pp. 1-8.
Gurghian et al., "DeepLanes: End-To-End Lane Position Estimation using Deep Neural Networks", IEEE Conference on Computer Vision and Pattern Recognition Workshops, Jun. 26-Jul. 1, 2016, pp. 38-45.
Huval et al., "An Empirical Evaluation of Deep Learning on Highway Driving", Apr. 17, 2015, pp. 1-7.
Redmon et al., "You Only Look Once: Unified, Real-Time Object Detection", May 9, 2016, pp. 1-10.
Mobileye, "The Most Advanced Technology on the Road", 2017, 1 Page.

* cited by examiner

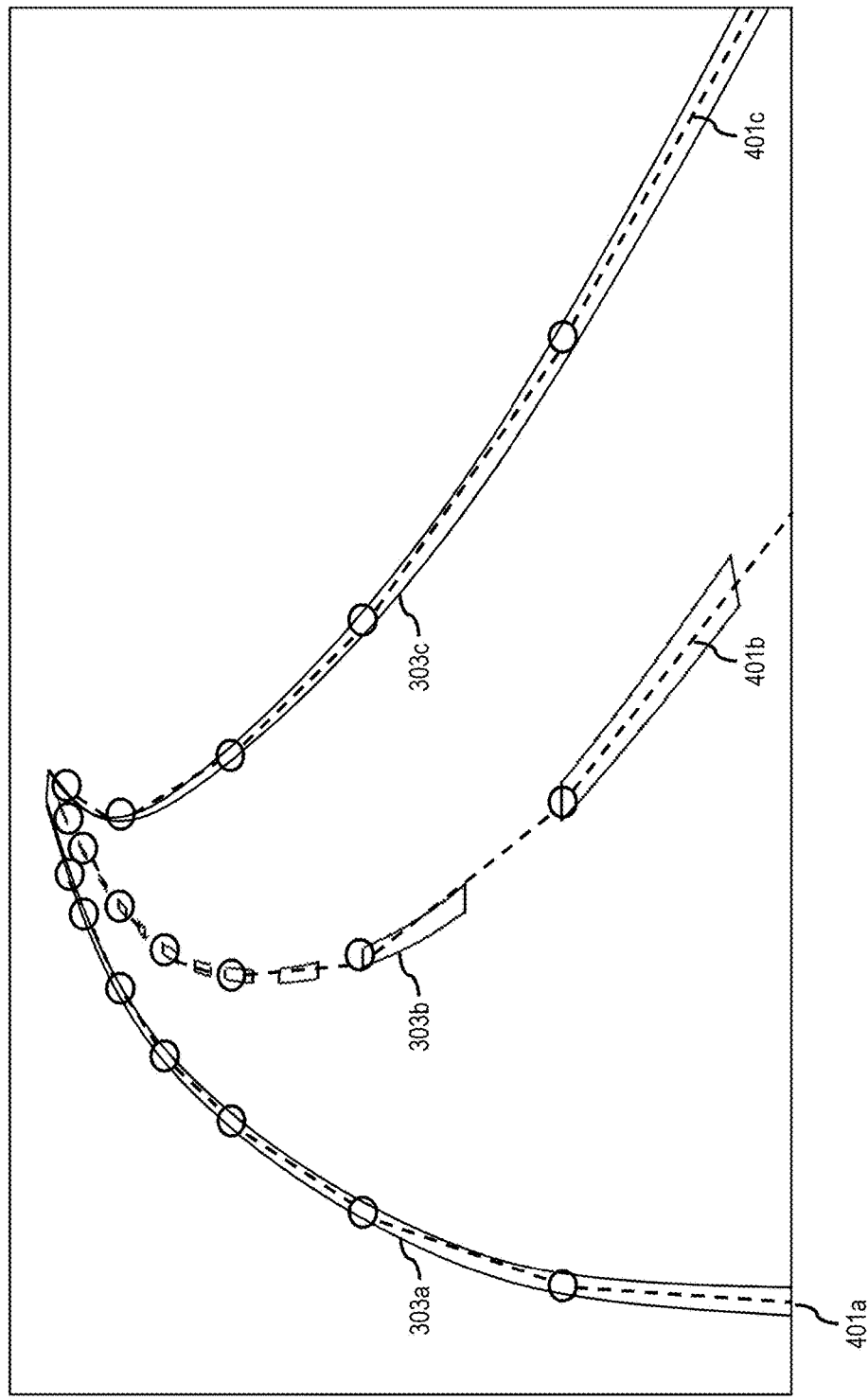

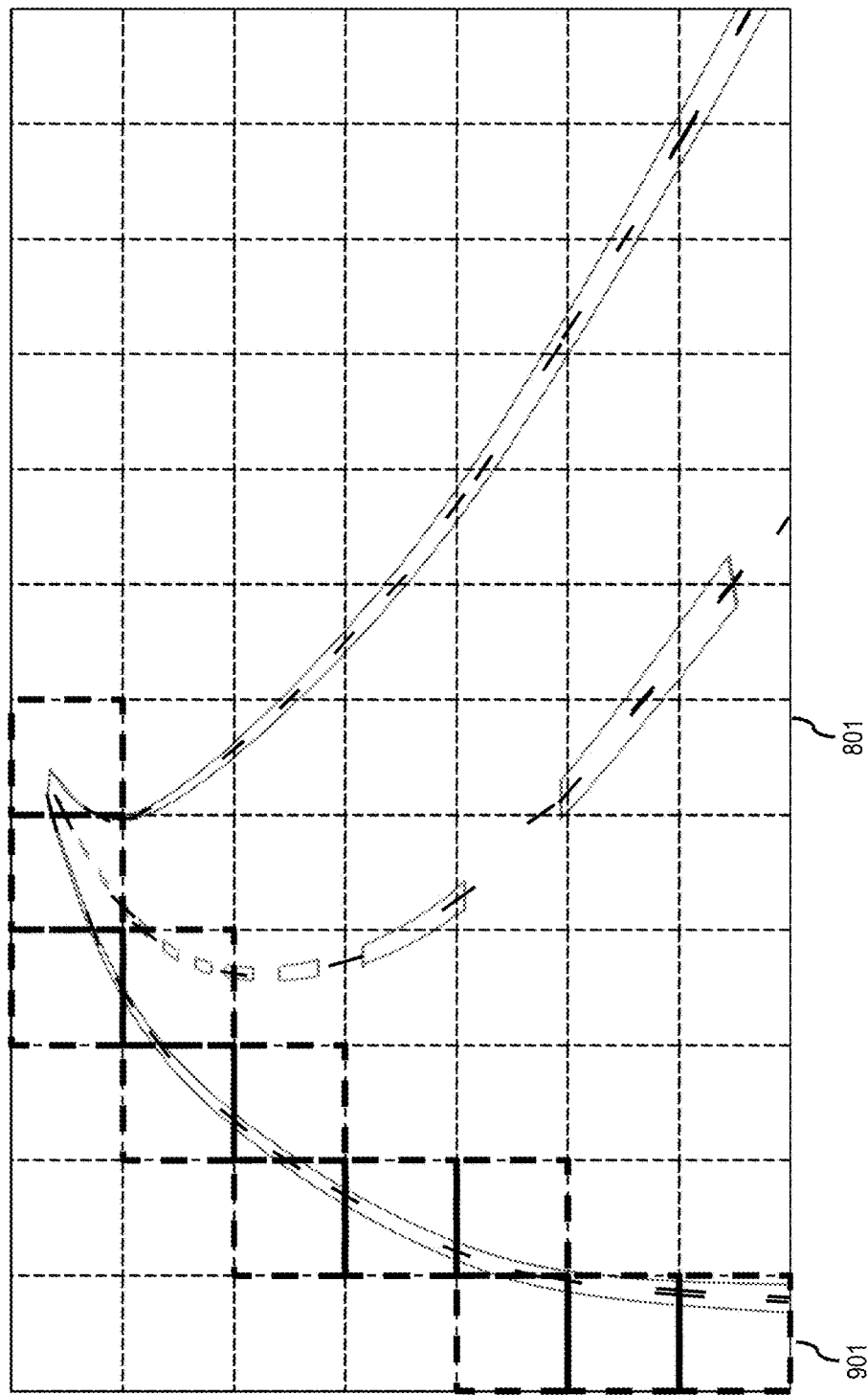

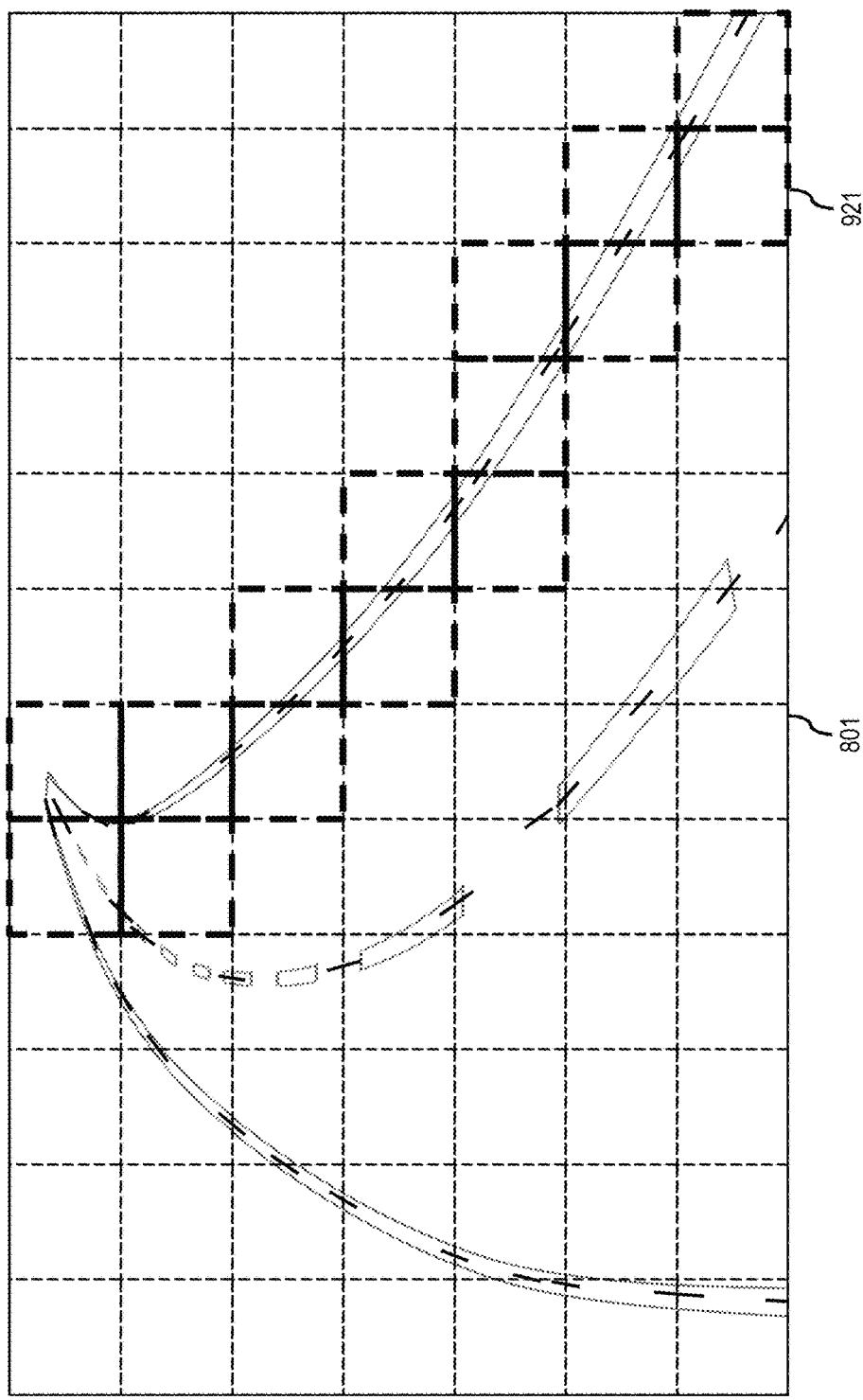

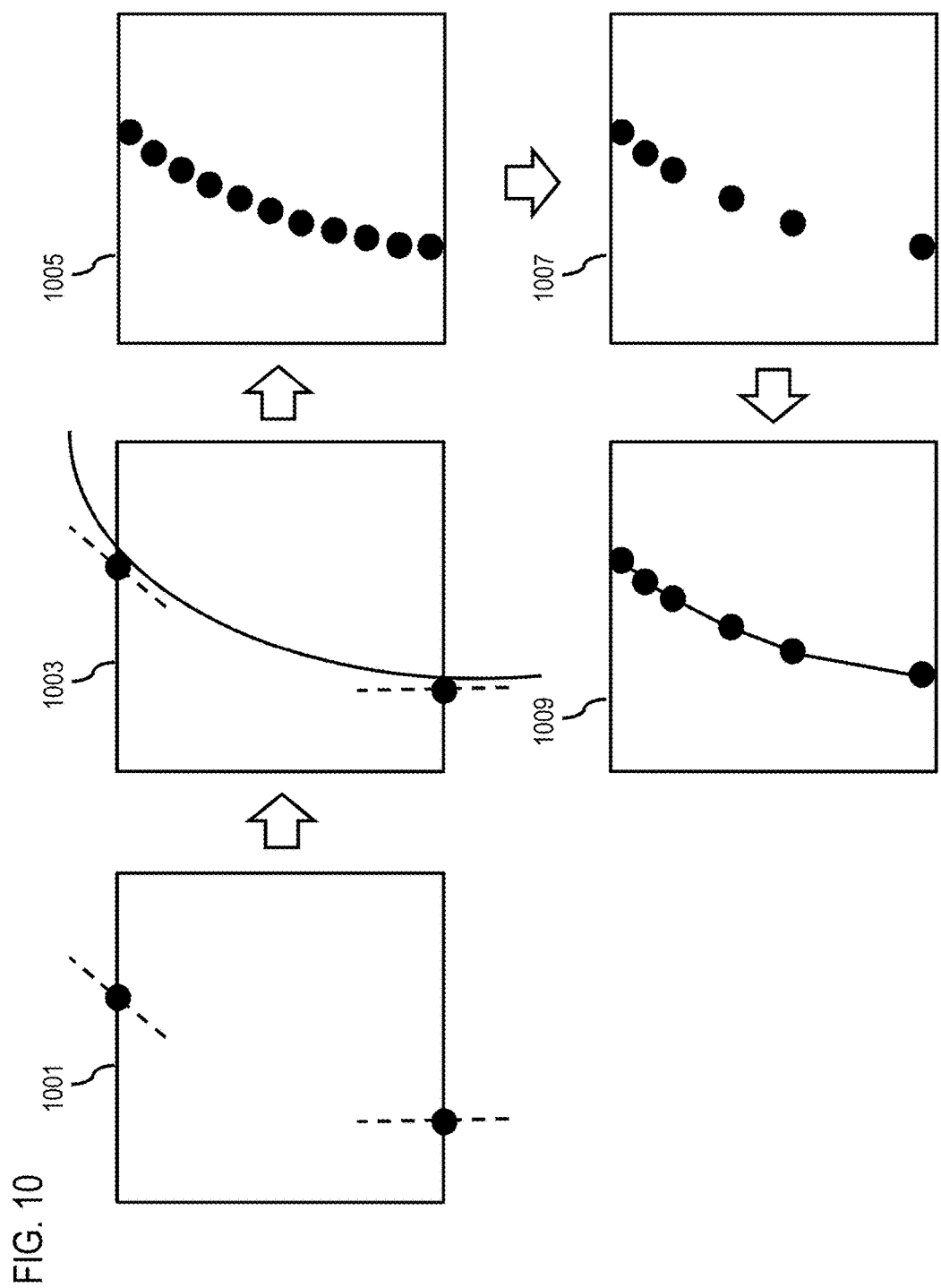

METHOD, APPARATUS, AND SYSTEM FOR A PARAMETRIC REPRESENTATION OF LANE LINES

BACKGROUND

Autonomous driving has quickly become an area of interest for vehicle manufactures and navigation and mapping service providers. One particular area of interest is the use of computer vision to enable mapping and sensing of a vehicle's environment to support autonomous or semi-autonomous operation. Advances in available computing power has enabled this mapping and sensing to approach or achieve real-time operation through, e.g., machine learning (e.g., neural networks). As a result, one application of vision techniques in autonomous driving is localization of the vehicle with respect to known reference marks such as lane markings and/or other visible environmental features. However, despite the noted advances in available computing power, service providers and manufacturers still face significant technical challenges to enable computer vision systems to efficiently recognize features such as lane markings during driving activities, particularly within distributed, multi-node systems, employed in advanced neural networks or other similar machine learning system.

SOME EXAMPLE EMBODIMENTS

Therefore, there is a need for an approach for generating a parametric representation of lane lines from captured images (e.g., a video capture stream from an autonomous vehicle) for use in advanced computer vision systems.

According to one embodiment, a method comprises segmenting, by a computer vision system, an input image into a plurality of grid cells. The method also comprises processing, by the computer vision system, a portion of the input image in each of the plurality of grid cells to detect one or more lane lines in said each grid cell. The method further comprises, for said each grid cell in which the one or more lane lines are detected, determining one or more intercepts of the one or more lane lines with one or more edges of said each grid cell, and one or more slopes of the one or more lane lines at the one or more intercepts. The method further comprises generating, by the computer vision system, a parametric representation of the one or more lane lines for said each grid cell. The parametric representation encodes the one or more intercepts and the one or more slopes into a data structure for said each grid cell. The method further comprises providing, by the computer vision system, an output parametric representation for the input image, wherein the output parametric representation aggregates the parametric representations of said each grid cell.

According to another embodiment, an apparatus comprises at least one processor, and at least one memory including computer program code for one or more computer programs, the at least one memory and the computer program code configured to, with the at least one processor, cause, at least in part, the apparatus to segment an input image into a plurality of grid cells. The apparatus is also caused to process a portion of the input image in each of the plurality of grid cells to detect one or more lane lines in said each grid cell. The apparatus is also caused to, for said each grid cell in which the one or more lane lines are detected, determine one or more intercepts of the one or more lane lines with one or more edges of said each grid cell, and one or more slopes of the one or more lane lines at the one or more intercepts. The apparatus is further caused to generate a parametric representation of the one or more lane lines for said each grid cell. The parametric representation encodes the one or more intercepts and the one or more slopes into a data structure for said each grid cell. The apparatus is further caused to provide an output parametric representation for the input image, wherein the output parametric representation aggregates the parametric representations of said each grid cell.

According to another embodiment, a non-transitory computer-readable storage medium carries one or more sequences of one or more instructions which, when executed by one or more processors, cause, at least in part, an apparatus to segment an input image into a plurality of grid cells. The apparatus is also caused to process a portion of the input image in each of the plurality of grid cells to detect one or more lane lines in said each grid cell. The apparatus is also caused to, for said each grid cell in which the one or more lane lines are detected, determine one or more intercepts of the one or more lane lines with one or more edges of said each grid cell, and one or more slopes of the one or more lane lines at the one or more intercepts. The apparatus is further caused to generate a parametric representation of the one or more lane lines for said each grid cell. The parametric representation encodes the one or more intercepts and the one or more slopes into a data structure for said each grid cell. The apparatus is further caused to provide an output parametric representation for the input image, wherein the output parametric representation aggregates the parametric representations of said each grid cell.

According to another embodiment, an apparatus comprises means for segmenting, by a computer vision system, an input image into a plurality of grid cells. The apparatus also comprises means for processing, by the computer vision system, a portion of the input image in each of the plurality of grid cells to detect one or more lane lines in said each grid cell. The apparatus further comprises means for determining one or more intercepts of the one or more lane lines with one or more edges of said each grid cell, and one or more slopes of the one or more lane lines at the one or more intercepts for said each grid cell in which the one or more lane lines are detected. The apparatus further comprises means for generating, by the computer vision system, a parametric representation of the one or more lane lines for said each grid cell. The parametric representation encodes the one or more intercepts and the one or more slopes into a data structure for said each grid cell. The apparatus further comprises means for providing, by the computer vision system, an output parametric representation for the input image, wherein the output parametric representation aggregates the parametric representations of said each grid cell.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams illustrating polyline representations of lane lines, according to one embodiment;

FIGS. 9A-9C are diagrams illustrating grid cells grouped based on shared borders that depict a continuous lane line, according to one embodiment;

FIG. 10 is a diagram illustrating a process for decoding a parametric representation of a lane line into a polyline representation of the lane line, according to one embodiment;

DESCRIPTION OF SOME EMBODIMENTS

Examples of a method, apparatus, and computer program for providing a parametric representation of travel lane lines are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
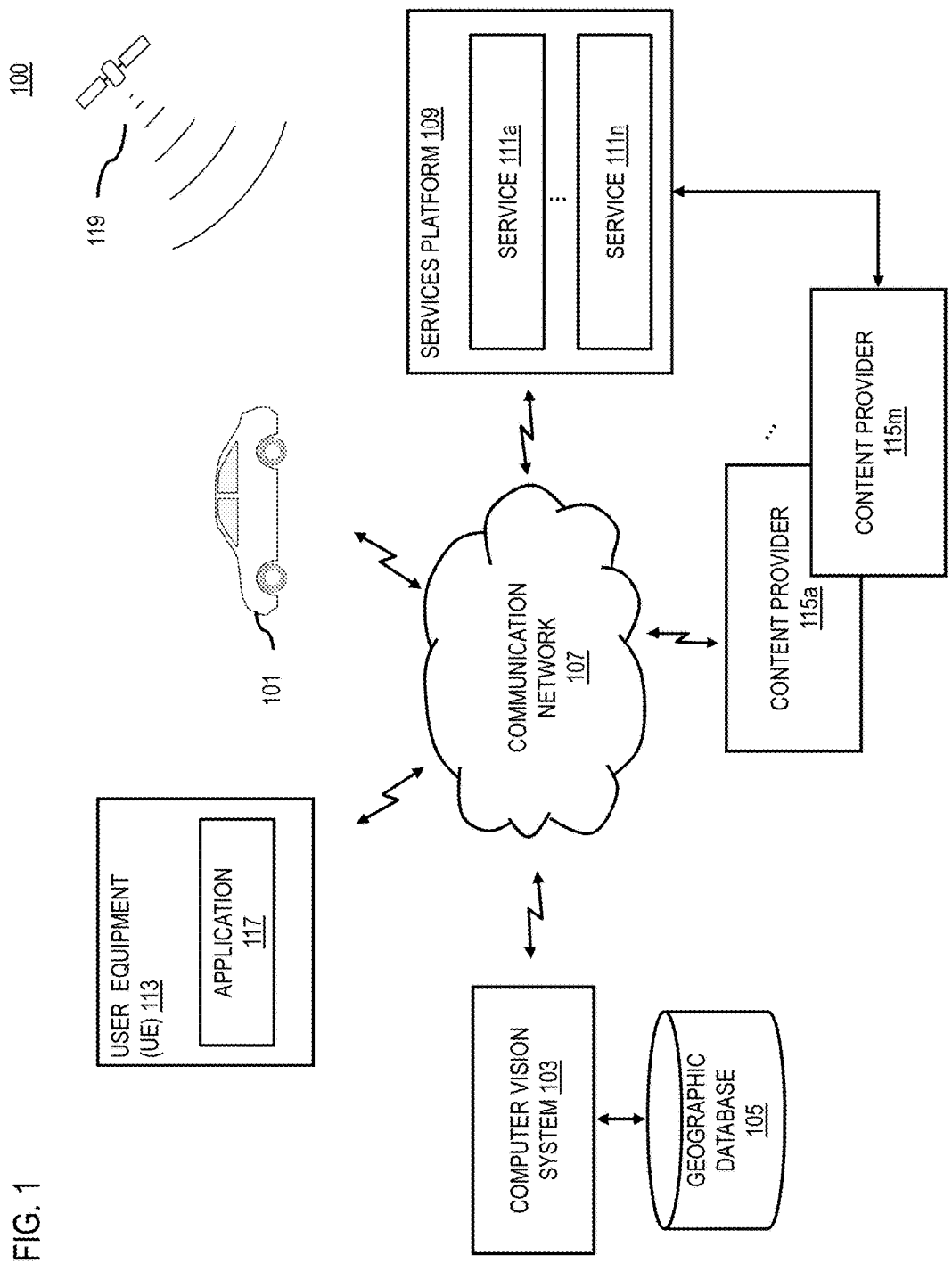
FIG. 1 is a diagram of a system capable of providing a parametric representation of lane lines, according to one embodiment.

FIG. 1 is a diagram of a system capable of providing a parametric representation of lane lines, according to one embodiment. As discussed above, autonomous driving has quickly become an area of intense interest, with recent advances in machine learning, computer vision and compute power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a computer vision system 103).

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to lane localization and also generally with respect to autonomous driving, high accuracy and real-time localization of vehicles 101 is needed. Traditionally, most vehicle navigation system has been accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

Figure 2:
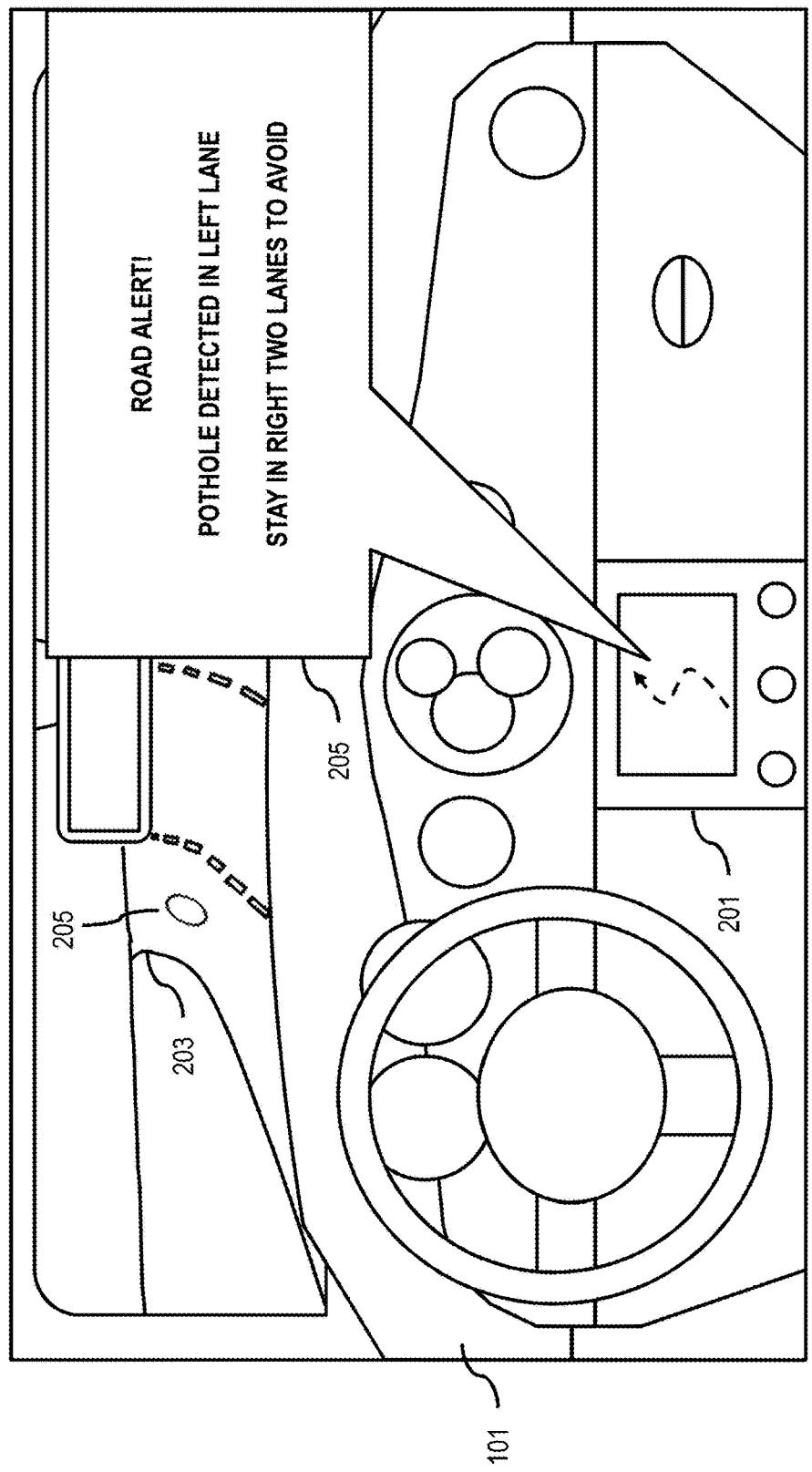
FIG. 2 is diagram illustrating example vehicle navigation system that can employ localization based on lane lines, according to one embodiment.

In general, a localization accuracy of around 10 cm is needed for safe driving in many areas. One way to achieve this level of accuracy is to use visual odometry, in which features are detected from imagery. These features can then be matched to a database of features to determine one's location. For example, FIG. 2 illustrates a vehicle 101 equipped with a navigation or autonomous vehicle control system 201 that employs an embodiment of a computer vision-based localization system as described herein. In this example, a pothole 205 has been detected or otherwise reported in the left lane of the roadway 203. The navigation or vehicle control system 201 can use lane localization to detect which lane of the roadway 203 the vehicle 101 is currently driving in (e.g., currently driving in the right lane). By employing visual odometry, the lane detection can be performed with sufficient accuracy to enable the system 201 to instruct the driver to remain in the detected right lane to avoid the pothole 205 in the left lane. In autonomous mode, the system 201 can operate the vehicle 101 so that it remains in the right lane until the pothole 205 is passed.

Traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types can provide better and more accurate localization with higher confidence.

In response to these issues, the system 100 of FIG. 1 (e.g., including the computer vision system 103) focuses on high level features that have semantic meaning for human beings. One such feature that is important to autonomous driving is the detection of lane markings and corresponding lane models. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101.

One technique that has shown significant ability to detect lanes is the use of convolutional neural networks. Neural networks have shown unprecedented ability to recognize objects in images, understand the semantic meaning of images, and segment images according to these semantic categories. Despite the successful use of neural networks to detect lane markings and create lane models, a fundamental problem remains. Neural network-based lane detectors must compromise between flexibility of representation and semantic understanding of the lane geometry. On the one hand, a pixel-based segmentation of an image of a road can show every pixel that corresponds to a lane line. Yet converting this image mask into a lane model requires a significant amount of additional processing. On the other hand, a model that outputs parametric representations of lane lanes can impose a large bias onto the potential arrangement of lane lines. This tradeoff is particularly notable when one considers the fact that the most successful implementations of neural networks are often those for which the network can be trained completely end-to-end. Such end-to-end networks have shown increased accuracy and speed.

In addition, the success of localization based on features from an image depends on the precise localization of those features within the image. From this standpoint, pixel-based approaches present another challenge. To increase the precision of the network output, more pixels must be used. Thus, an increase in the precision of the localization of features requires an increase in the number of pixels, which in turn increases the number of computational operations and the potentially the number of weights for the network. This behavior is undesirable, and in general parametric representations do not suffer from this problem because they can specify the values of parameters with arbitrary precision.

Accordingly, the system 100 of FIG. 1 introduces a flexible approach to parametrically represent a lane model in such a way that addresses the problems discussed above. In one embodiment, the embodiments of approach to parametrically representing lane lines as lane models can easily be represented by a neural network. More specifically, this various embodiments described herein enable the encoding of a set of polylines that represent the centerlines of lane markings into a compact representation with minimal loss of information. After creating the parametric representation of a lane line, this representation can be decoded into the original lane models for use during localization and mapping. The conversion between the encoded and decoded representations of the lane models is generally computationally cheap, such that it can be performed in real-time while a vehicle 101 is driving. In one embodiment, such a representation enables a neural network to describe the semantics of a lane model without imposing burdensome constraints.

Although the various embodiments described herein discuss a computer vision system 103 that employs a neural network (e.g., a convolutional neural network) to recognize lane lines or markings in input image data, it is contemplated that any type of computer vision system 103 using any other machine learning technique or other image processing technique can use the approaches to parametric representations of lane lines as described herein. In addition, although the parametric representations are discussed with respect lane lines or markings, it is also contemplated that the parametric representations can be used to represent any linear or curved edge or feature depicted in captured image data.

Figure 3:
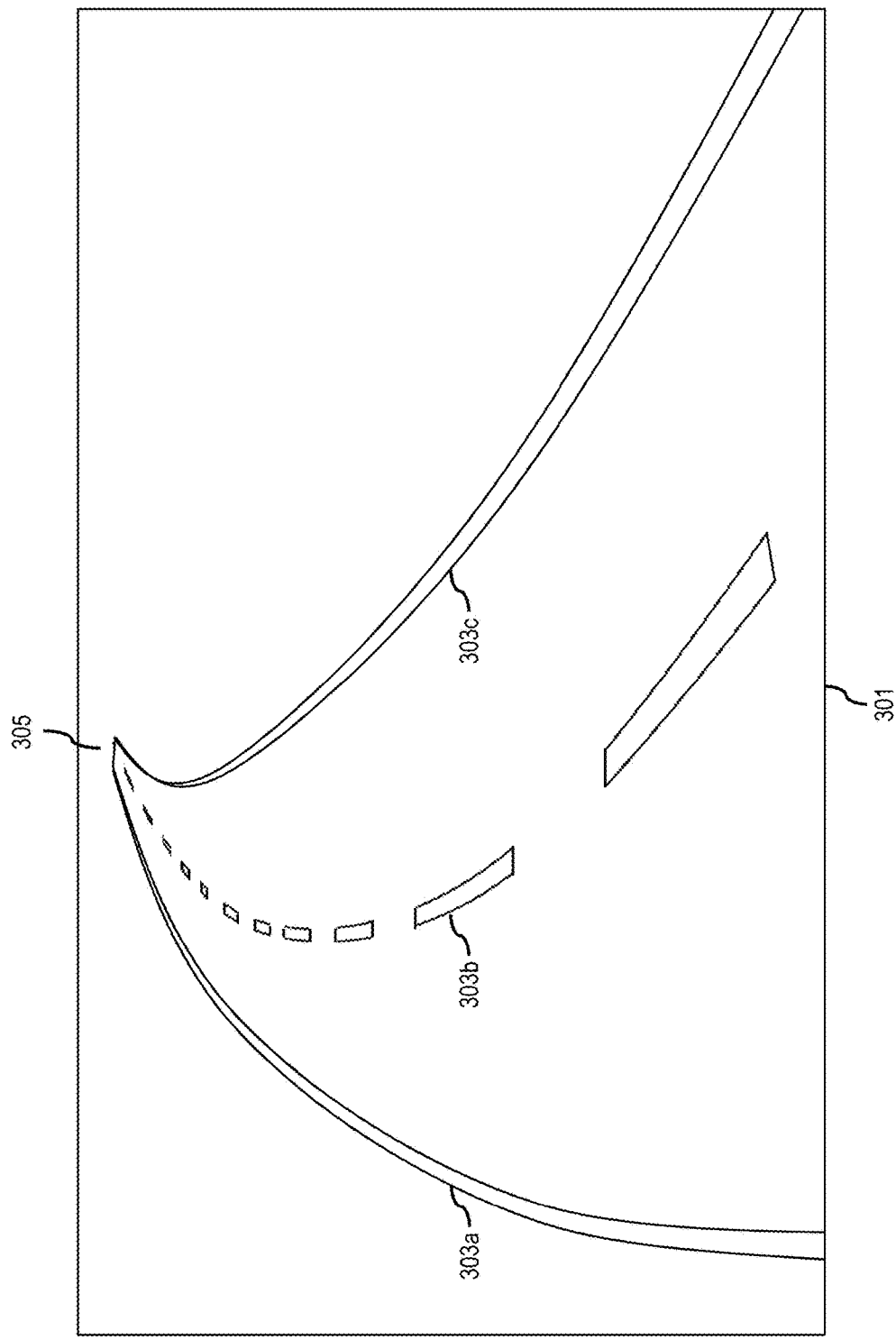
FIG. 3 is a diagram of an input image of lane lines captured by a vehicle camera system, according to one embodiment.

FIG. 3 is a diagram of an example input image 301 depicting lane lines 303a-303c captured by a vehicle camera system, according to one embodiment. In this example, the image 301 is captured in real-time by a camera system of a vehicle 101 as raster images at a predetermined pixel resolution. In one embodiment, the image 301 can be captured using cameras sensitive to visible light, infra-red, and/or any other wavelength of light. To support real-time operation, the image 301 can be part of an image stream captured at a relatively high frequency (e.g., 20 Hz, 30 Hz, or higher). Each frame of the image stream can then be processed to provide real-time detection of lane-lines.

In one embodiment, as shown in FIG. 4A, lane models are typically represented as sets of polylines 401a-401c, in which the centerlines of the respective lanes 303a-303c are represented by piecewise-linear functions with an arbitrary number of points. In the example of FIG. 4A, the polylines 401a-401c represent each lane 303a-303a a series of line segments (e.g., shown as dotted lines) with articulation points between the line segments indicated by circles.

Figure 4B:
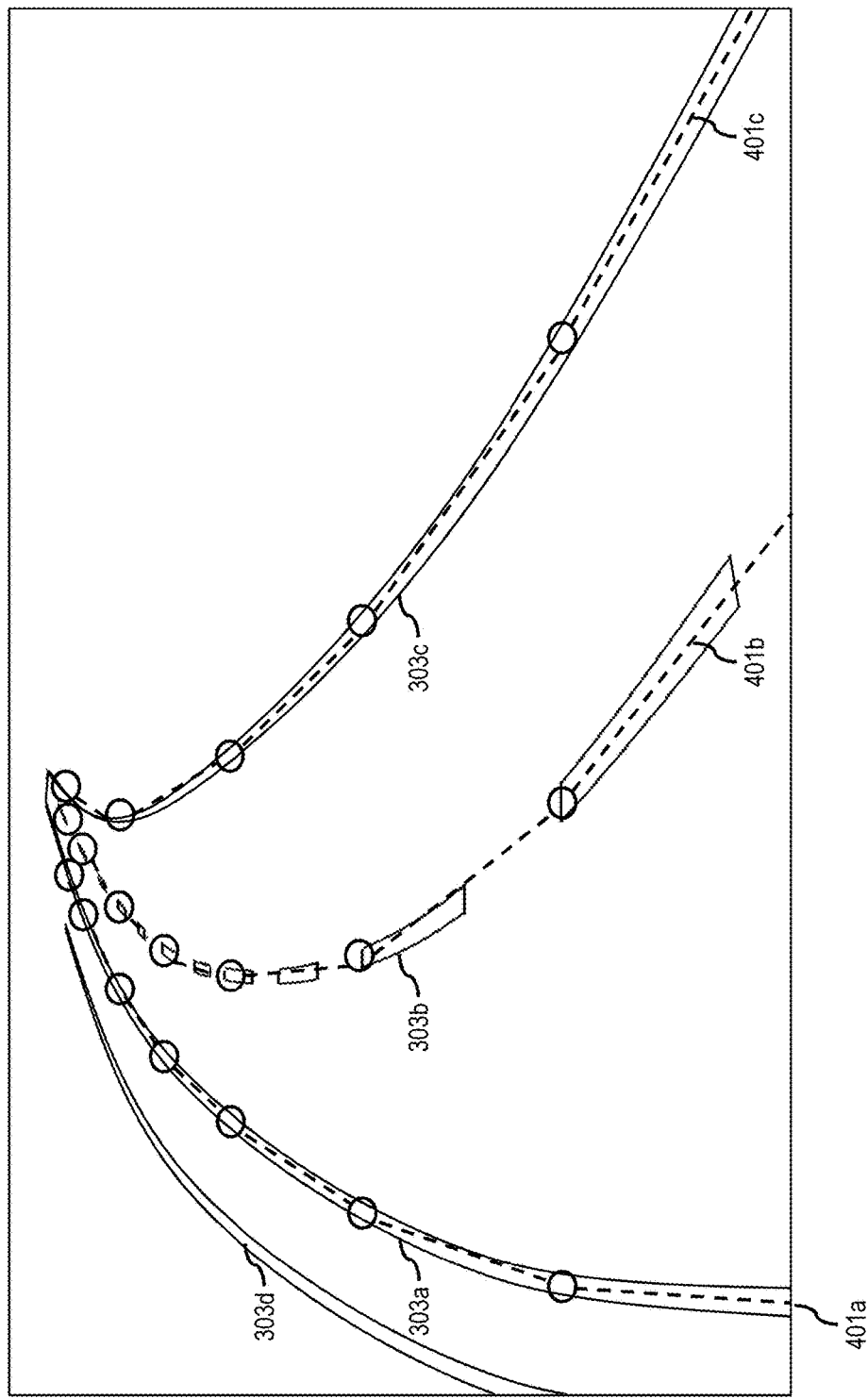

Generally, it can difficult for a neural network to output this type of representation (i.e., output polyline representations directly from an image), for several reasons. First, neural networks are usually a fixed size, and as a result have a fixed size input and output. On the other hand, the polyline representation above can have both a variable number of lines per image and a variable number of points per line. Representing this variability in a fixed size output can be challenging. One possible solution could be to output a tensor that is large enough to capture even a large number of points and lines. However, in this case the correspondence between outputs and lines is still not well defined. For example, output 1 could correspond to the left-most lane 303a, output 2 could correspond to the middle lane 303b, and output 3 could correspond to the right lane 303c. In this scenario, as shown in FIG. 4B, the appearance of a lane 303d far to the left would affect every other lane. This is because to maintain the same left-to-right lane ordering as shown in FIG. 4A, the existing lanes 303a-303c would have to be moved to outputs 2, 3, and 4, to allow output 1 to correspond to newly detected lane 303d. This dependence of this type of parametric representation of one lane line on the existence of other lane lines is not ideal, because if the system 100 makes one mistake in detecting or not detecting a lane line, that mistake could affect all other lane markings as well. For example, if the left lane 303d in FIG. 4B was not detected in a previous image or frame of a video stream (e.g., FIG. 4A has no left lane 303d), then the outputs of the polyline detection would no longer match from image to image without further processing to realign the outputs. Moreover, even if this problem can be addressed, such a representation would still require the output of such a computer vision system to have a global scope because at least one processing node (e.g., a neuron of a neural network) would have to process image data that encompasses all features of the entire image to ensure no lane is missed or to realign the outputs. As a result, the system or neural network would require at least one fully connected layer (e.g., a layer that spans the entire input image). Such fully connected layers significantly can increase both the size and the complexity of neural networks.

Figure 5:
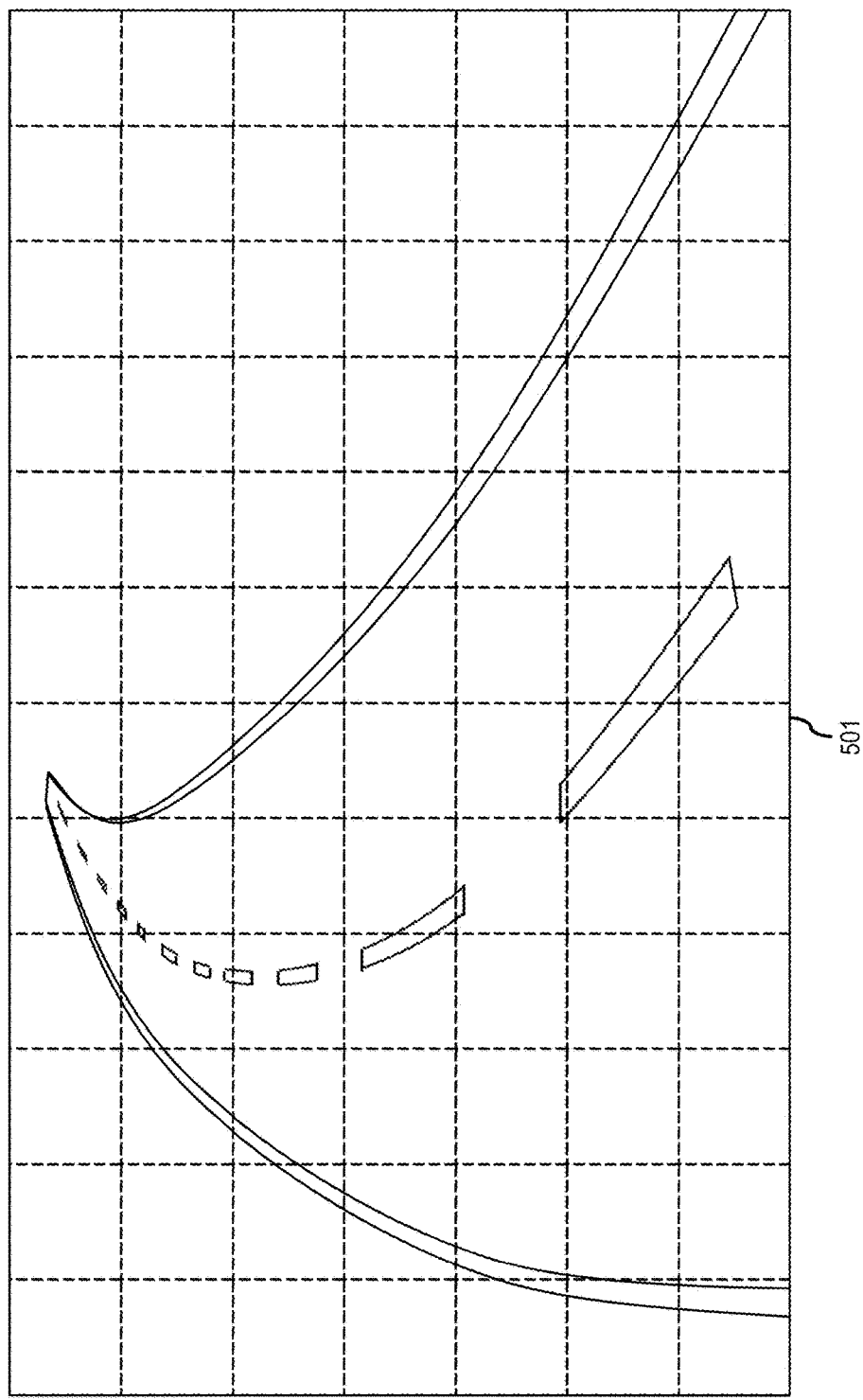
FIG. 5 is a diagram illustrating a segmentation of an input image into grid cells, according to one embodiment.

To address this problem, in one embodiment, the system 100 of FIG. 1 introduces a more natural representation of lane lines for a neural network that is based on a grid of squares overlaid with the input image as shown in the grid 501 of FIG. 5. In the example of FIG. 5, the grid 501 segments the input image (e.g., the image as shown in FIG. 3) into individual grid cells. In one embodiment, such a grid can be output by a fully convolutional neural network, which has the advantage of being computationally fast without having an excess of parameters that might lead to overfitting. For example, with respect to a neural network or other similar parallel processing system, each of the grid cells can be processed by a different neuron or processing node to more efficiently employ the available neurons or nodes and distribute the computational load for processing the entire input image. In other words, in one layer of the neural network, the scope of each neuron corresponds to the extent of the input image area within each respective grid cell. Each neuron or node can make is prediction (e.g., detection of a lane line) for each individual grid cell, thereby advantageously avoiding the computational resource burden associated with having to have a fully connected layer.

As a result of this segmentation, the basic unit of representation then becomes each cell of the grid, in which each lane line is parametrically encoded. It is contemplated that any number of parametric encodings are possible to parametrically represent the portion of the lane line detected in each cell. For example, in one embodiment, the system 100 can encode the line as a slope and an intercept, such that the lane is assumed to be locally linear within each grid cell. Accordingly, in this embodiment, a lane line in a grid cell can be parametrically represented with a minimum of two parameters: (1) one parameter indicating an intercept of the lane line with an edge of the grid cell, and (2) a slope of detected lane line at the intercept.

Figure 6:
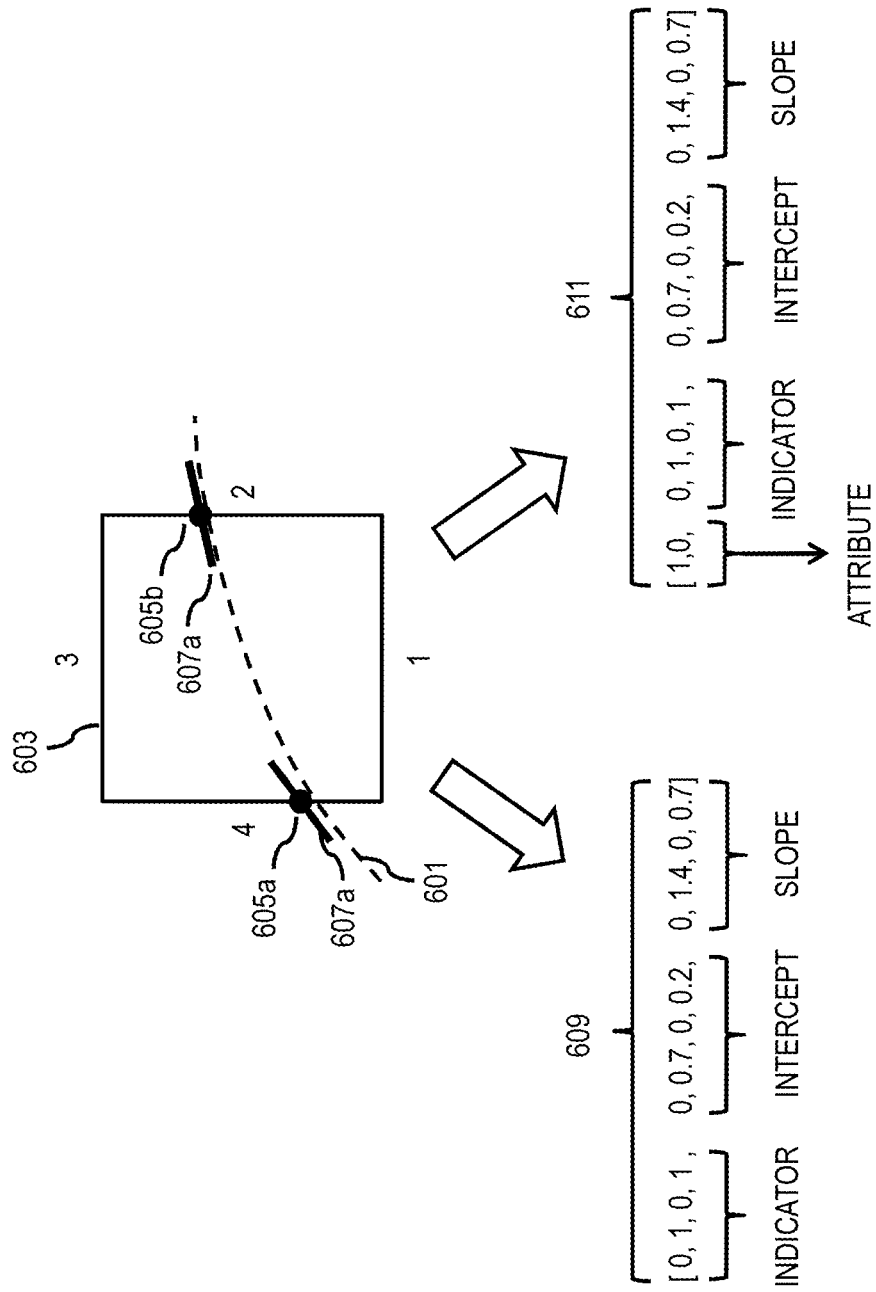
FIG. 6 is a diagram illustrating a parametric representation of a lane line detected in a grid cell unit, according to one embodiment.

In another embodiment, the system 100 can use a more sophisticated representation for the parametric encoding. Specifically, instead of assuming a straight line through a cell, the system 100 can track the behavior of a lane line at each of the four edges of a grid cell. FIG. 6 is a diagram illustrating an example of this more sophisticated parametric representation of a lane line detected in a grid cell unit, according to one embodiment. In this example, a detected lane line 601 (dotted line) crosses a grid cell 603 at intercept points 605a and 605b along edges 2 and 4 of the grid cell. The tangents 607a and 607b of the lane line are shown in red at each edge of the cell. The slopes of the tangents 607a and 607b are then associated with each respective intercept. It is contemplated that the slopes can also be expressed as angles of the tangents 607a and 607b with respect to a reference line.

In one embodiment, at each of these edges, the system 100 records three values as the parametric representation of the detected lane lines: (1) an indicator value to say that the lane crossed the edge, (2) the slope or angle of the line, and (3) the intercept of the line at that edge. As a result, in one embodiment, each lane in each cell will be represented by 12 parameters (e.g., shown as representation 609 in FIG. 6). For example, the representation 609 of the lane in the above cell would be [0, 1, 0, 1, 0, 0.7, 0, 0.2, 0, 1.4, 0, 0.7] where the first four numbers are indicators that describe whether the lane crosses edges 1, 2, 3, 4, respectively, the next four numbers describe the value of the intercepts at those edges, and the last four numbers describe the angle of the lane in radians.

In one embodiment, the indicator value is 1 if the detected lane line crosses the edge, and 0 if the detected lane line does not cross the edge. In one embodiment, during prediction by the system 100 (e.g., neural network), the indicator values above become probabilities that a lane line crosses the given boundary (e.g., 0 corresponding to zero probability of a crossing, 1 corresponding to crossing highest probability of a crossing, and other values spanning the range to indicate different probabilities). In one embodiment, the intercept value represents a point of intersection on the edge with the edge spanning from 0 to 1 distance units along a reference direction. In one embodiment, as discussed above, the slope value represents a slope of the tangent line at the intercept which can also be expressed as an angle with respect to a reference line. This angle can be express according to any angular measurement unit (e.g., radians, degrees, etc.) and/or coordinate system.

The embodiments of the parametric representation of lane lines discussed above have several advantages. First, the curvature of the line within the cell can be represented because the input and output angles are known. In other words, a curve corresponding to the detected lane line can be determined from just the parametric representation of the intercepts and slopes of the detected lane lines. Therefore, a representation of the detected lane line within each cell can be determined from data from the edges of the cell, thereby reducing the memory and computational results that would be needed if additional data is needed to describe the lane line within each cell.

As another advantage, although parametric representation of a lane line in each grid cell can be independently determined without reference to data external to the cells, two adjacent cells will both predict the intercept and slope for a shared edge. In one embodiment, the system 100 can use this duplicate information to join cells back together during decoding, and to smooth the representation of the line by averaging.

Figure 7:
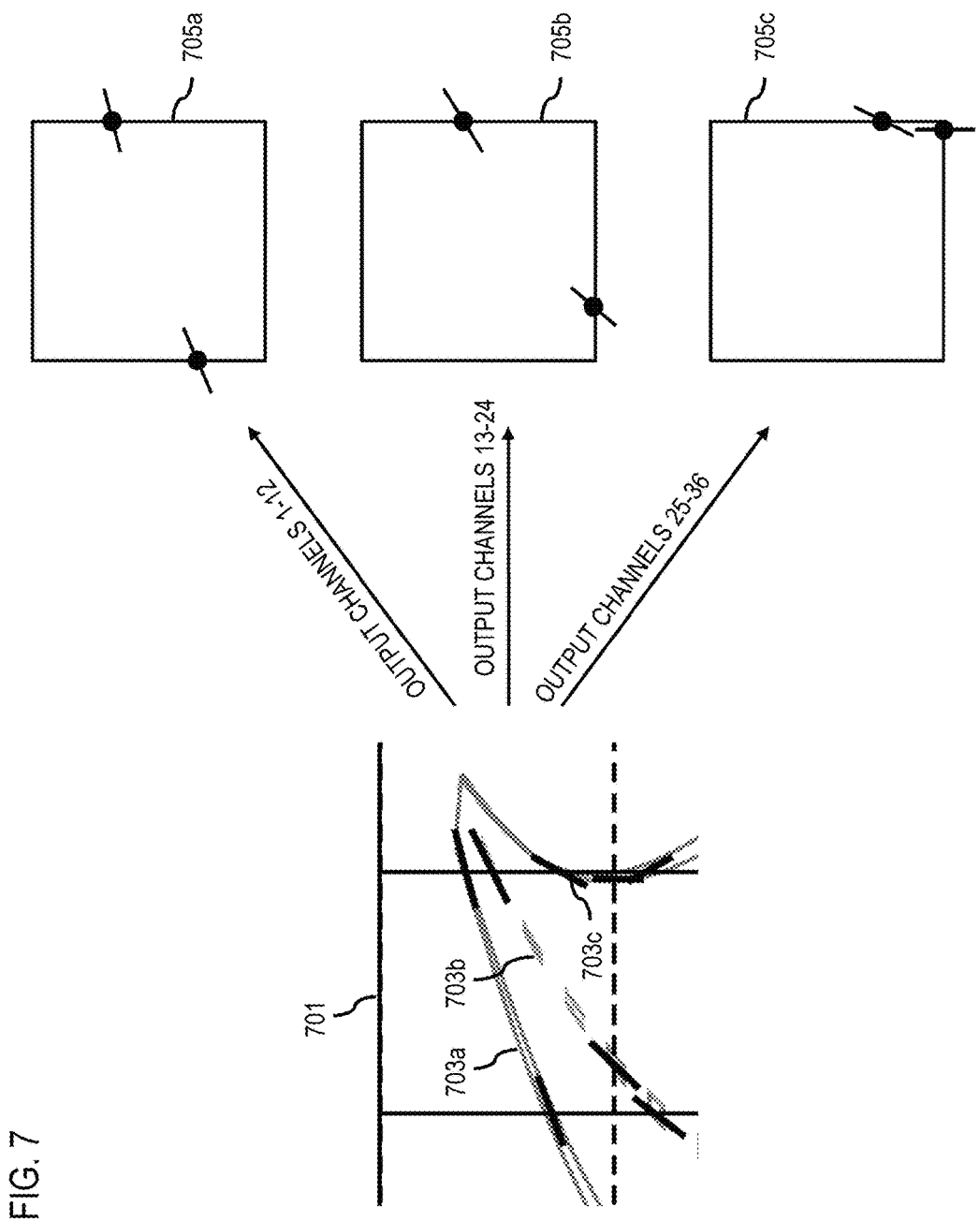
FIG. 7 is a diagram illustrating a parametric representation of multiple lane lines detected in a single grid cell in multiple output channels of the grid cell, according to one embodiment.

In one embodiment, an arbitrary number of lane lines can be output per cell by simply increasing the number of channels. For example, the representation 609 has 12 parameters. Therefore, the system 100 can increase the number of output channels from 12 to 12n, where n is the desired number of lane lines per cell. An example of increasing the number of output channels to accommodate additional lane lines is illustrated in FIG. 7. In this example, a grid cell 701 delineates a portion of an input message that depicts three lane lines 703a-703c. Using, for instance, the 12-parameter parametric representation of a lane, the system 100 can represent lane line 703a in output channels 1-12 to generate parametric representation 705a, represent lane line 703b in output channels 13-24 to generate parametric representation 705b, and represent lane line 703c in output channels 25-36 to generate parametric representation 705c.

As another advantage, the system 100 can further classify lane lines by adding classification outputs to the representation. For example, returning to FIG. 6, additional attribute outputs can be added to the 12-parameter representation to generate the expanded parametric representation 611. For example, in addition to the 12 parameters that define the geometry of the line, an additional two parameters could be added to specify any additional attributes of the lines. For example, one attribute can used to indicate whether a detected lane line is solid (e.g., indicated by 1,0), dashed (e.g., indicated by 0,0), double lines (e.g., indicated by 0,1), etc. With respect to example grid cell 603 of FIG. 6 above, the solid line may be represented as [1, 0, 0, 1, 0, 1, 0, 0.7, 0, 0.2, 0, 1.4, 0, 0.7], where the first two numbers describe the type of lane. In this scenario, each additional class adds a total number of parameters equal to the number of cells. Because the grid is usually low resolution (e.g., a low resolution grid of 50×38, giving 1900 outputs), the addition of classes or attributes does not significantly affect the size of the output relative to the total size of the network.

Figure 8:
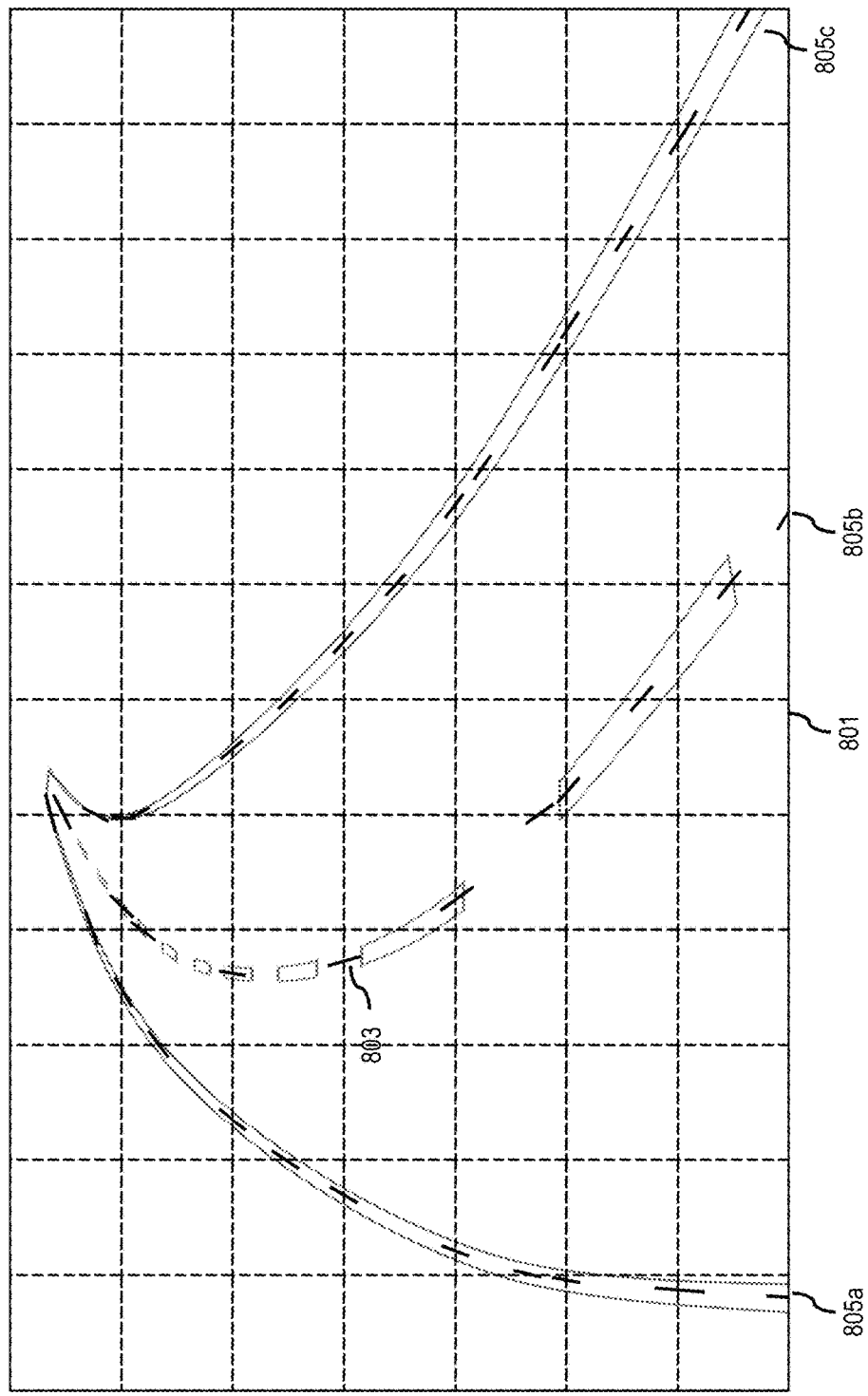
FIG. 8 is a diagram illustrating a parametric representation of lane lines detected in an input image, according to one embodiment.

After each grid cell is processed to generate its respective parametric representation of any detected lane lines within the cells, the parametric representations for each cell can be aggregated to form more complete picture of the detected lines. As shown in FIG. 8, an output parametric representation of the entire input image is superimposed on the initial input image. In this example, line segments are drawn from the intercepts of lane lines at the appropriate angles at each cell edge. An example of one line segment is line segment 803. The remaining line segments are not labeled, but are depicted as short solid lines at each edge of a cell at which a line crosses. These series of line segments correspond for instance to respective lane lines 805a-805c.

In one embodiment, this output 801 of aggregated parametric representations from each cell grid can be decoded to the original polylines using a number of methods. For example, one method is to look for cells with two edges with large indicator values and to simply join the intercepts from these cells. As a result, the joined intercepts would represent the junctions of the polyline, and then line segments can be drawn between each junction to generate a polyline to represent the lane model. However, while conceptually simple, this example approach does not take advantage of the rich information encoded in this representation.

In another embodiment, the system 100 uses the encoded rich information to create a more optimized polyline lane model. For example, the system 100 analyzes all shared cell borders of the aggregated output 801. At shared each border where both cells predict a line crossing at the same edge, the system 100 is configured to assume that two cells sharing border at which a lane line crosses the shared border will predict the same values for confidence, slope, and intercept at each of the respective cells. Accordingly, the system 100 can identify in the parametric representation output results those cells with shared borders at which lane lines cross. Then if the parametric representation values are within a certain tolerance (e.g., intercepts and/or slopes match within a predetermined tolerance level), the system 100 merges the cells to be part of the same lane line. In one embodiment, the tolerance level can be increased to promote a looser merging of cells, or decreased to promote a tighter or more restrictive merging of cells.

Figure 9B:
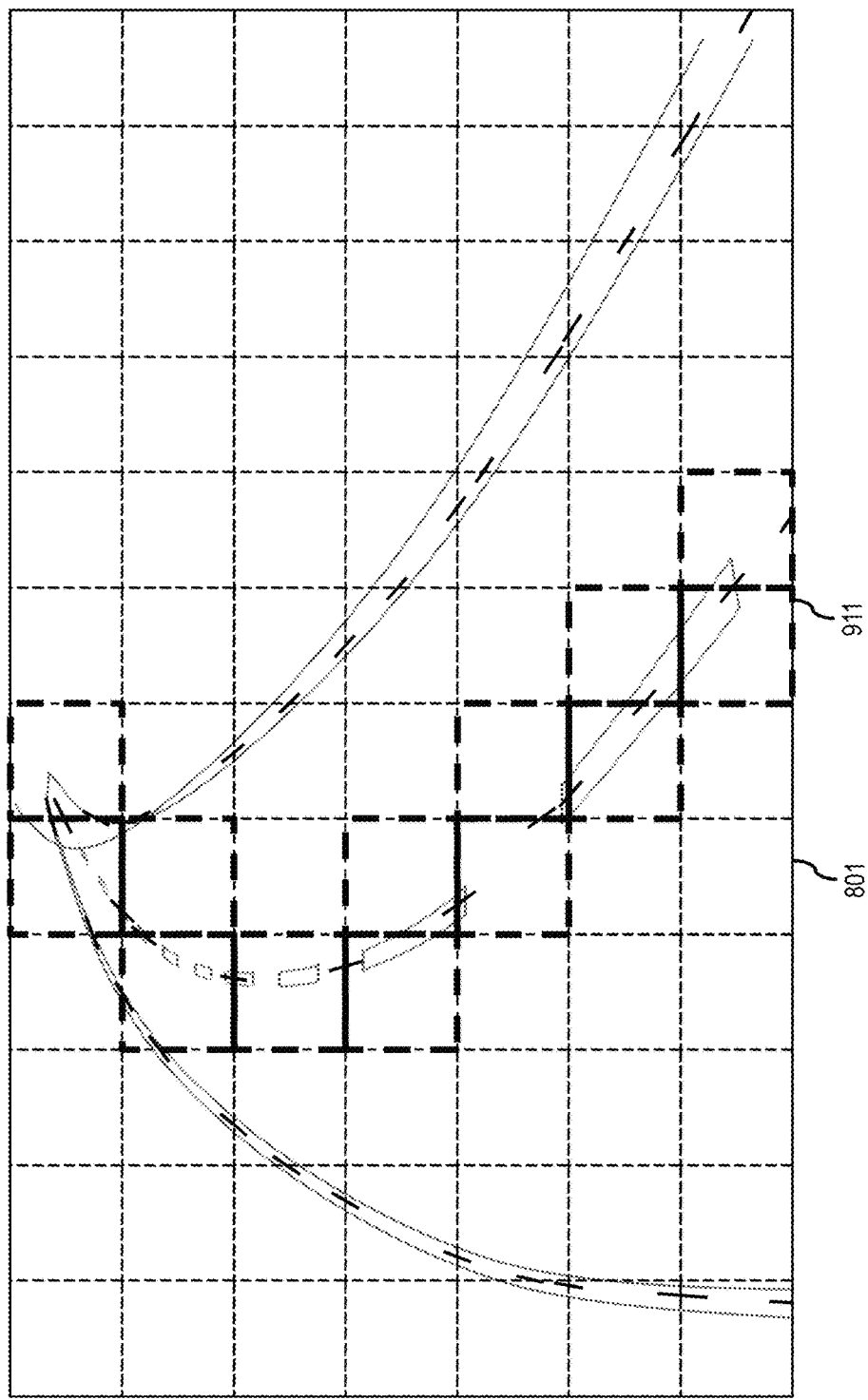

Once the merging is complete, the system 100 will have groups of cells that each contain parameters for a given lane line. FIGS. 9A-9C are diagrams illustrating grid cells grouped based on shared borders that depict a continuous lane line, according to one embodiment. In each of FIGS. 9A-9C, the aggregated output 801 of FIG. 8 is depicted. This aggregated output 801 includes three separate detected lane lines. FIG. 9A depicts a first group of cells 901 (e.g., indicated in FIG. 9A by cells with thicker borders) that have been group according to the process described above to merge cells corresponding to a first detected lane line. FIG. 9B depicts a second group of cells 911 (e.g., indicated in FIG. 9B by cells with thicker borders) that are associated with a second detected lane line. Similarly, FIG. 9C depicts a third group of cells 921 (e.g., indicated in FIG. 9C by cells with thicker borders) that are associated with a third detected lane line.

In one embodiment, the system 100 then can decode the grouped cells to construct a lane model of the detected lane lines (e.g., a polyline). FIG. 10 is a diagram illustrating a process for decoding a parametric representation of a lane line into a polyline representation of the lane line, according to one embodiment. For each set of group cells, the system 100 averages the intercepts and slopes for all shared cell walls (at 1001). Within each cell, the system 100 computes a curve based on the intercepts and slopes along edges of the cells (at 1003). For example, in a typical cell with two intercepts, the system 100 can fit a curve that encompasses the intercepts. The degree of curvature can then be based on the slope values at each of the intercepts. By way of example, the system 100 can compute the curve as a third order Hermite polynomial, a Bezier curve, and/or any other similar curves.

At process 1005, the system 100 can use the determined curve for each cell to calculate a large number of points along the curve. In one embodiment, a "large number" refers to a number points greater than a number needed to represent the curve using a polyline. They system 100 can then simplify the lane line as now represented by the large number points along the curve by removing points that are not needed to define a shape of the curve to a predetermined degree of accuracy or precision (at 1007). For example, the system 100 can use an algorithm such as the Ramer-Douglas-Peucker algorithm to simplify the curve. In one embodiment, at process 1009, the system 100 connects points remaining in the simplified representation to generate the final result as a set of polylines representing the lane models.

Returning to FIG. 1, as shown, the system 100 includes a computer vision system 103 configured to perform the functions associated with generating and/or decoding the parametric representations of lane lines detected in an input image according to the various embodiments described herein. In one embodiment, the computer vision system 103 includes a neural network or other machine learning/parallel processing system to automatically detect features such as lane lines in image data to support localization of, e.g., a vehicle 101 within the sensed environment. In one embodiment, the neural network of the computer vision system 103 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the computer vision system 103 also has connectivity or access to a geographic database 105 which representations of mapped geographic features to facilitate video odometry to increase localization accuracy. The geographic database 105 can also store parametric representations of lane lines and other similar features and/or related data generated or used to encode or decode parametric representations of lane lines according to the various embodiments described herein.

In one embodiment, the computer vision system 103 has connectivity over a communication network 107 to a services platform 109 that provides one or more services 111a-111n (also collectively referred to as services 111). By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the computer vision system 103 (e.g., parametric representations of lane lines) to localize the vehicle 101 or a user equipment 113 (e.g., a portable navigation device, smartphone, portable computer, tablet, etc.) to provide services 111 such as POI recommendations, advertising intelligence, etc.

In one embodiment, the computer vision system 103 may be a platform with multiple interconnected components. The computer vision system 103 may include multiple servers, intelligent networking devices, computing devices, components and corresponding software for providing parametric representations of lane lines. In addition, it is noted that the computer vision system 103 may be a separate entity of the system 100, a part of the one or more services 111, a part of the services platform 109, or included within the UE 113 and/or vehicle 101.

In one embodiment, content providers 115a-115m (collectively referred to as content providers 115) may provide content or data (e.g., including geographic data, parametric representations of mapped features, etc.) to the geographic database 105, the computer vision system 103, the services platform 109, the services 111, the UE 113, the vehicle 101, and/or an application 117 executing on the UE 113. The content provided may be any type of content, such as map content, textual content, audio content, video content, image content, etc. In one embodiment, the content providers 115 may provide content that may aid in the detecting and classifying of lane lines and/or other features in image data. In one embodiment, the content providers 115 may also store content associated with the geographic database 105, computer vision system 103, services platform 109, services 111, UE 113, and/or vehicle 101. In another embodiment, the content providers 115 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the computer vision system 103.

In one embodiment, the UE 113 and/or vehicle 101 may execute a software application 117 to collect, encode, and/or decode lane line detected in image data into the parametric representations according the embodiments described herein. By way of example, the application 117 may also be any type of application that is executable on the UE 113 and/or vehicle 101, such as autonomous driving applications, mapping applications, location-based service applications, navigation applications, content provisioning services, camera/imaging application, media player applications, social networking applications, calendar applications, and the like. In one embodiment, the application 117 may act as a client for the computer vision system 103 and perform one or more functions of the computer vision system 103 alone or in combination with the system 103.

By way of example, the UE 113 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 113 can support any type of interface to the user (such as "wearable" circuitry, etc.). In one embodiment, the UE 113 may be associated with the vehicle 101 or be a component part of the vehicle 101.

In one embodiment, the UE 113 and/or vehicle 101 are configured with various sensors for generating or collecting environmental image data (e.g., for processing the computer vision system 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 113 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 113 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 113 and/or vehicle 101 may include GPS or other satellite-based receivers to obtain geographic coordinates from satellites 119 for determining current location and time. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the geographic database 105, computer vision system 103, services platform 109, services 111, UE 113, vehicle 101, and/or content providers 115 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
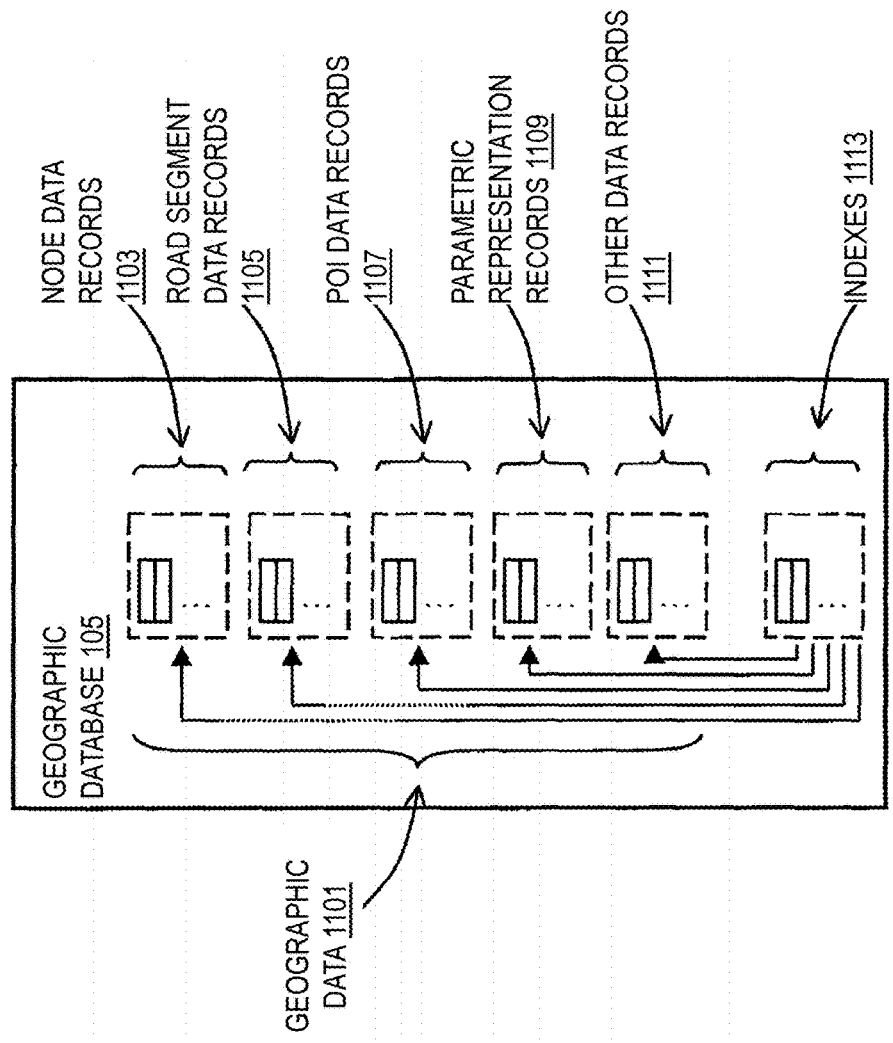
FIG. 11 is a diagram of a geographic database, according to one embodiment.

FIG. 11 is a diagram of a geographic database, according to one embodiment. In one embodiment, the geographic database 105 includes geographic data 1101 used for (or configured to be compiled to be used for) mapping and/or navigation-related services, such as for video odometry based on the parametric representation of lanes include, e.g., encoding and/or decoding parametric representations into lane lines. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 1103, road segment or link data records 1105, POI data records 1107, parametric representation records 1109, other records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 105. In one embodiment, the indexes 1113 may be used to quickly locate data without having to search every row in the geographic database 105 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 1107. The geographic database 105 can also include data about places, such as cities, towns, or other communities, and other geographic features, such as bodies of water, mountain ranges, etc. Such place or feature data can be part of the POI data records 307 or can be associated with POIs or POI data records 1107 (such as a data point used for displaying or representing a position of a city).

In one embodiment, the geographic database 105 can also include parametric representations records 1109 for storing parametric representations of the lane lines detected from input image data according to the various embodiments described herein. In one embodiment, the parametric representation records 1109 can be associated with one or more of the node records 1103, road segment records 1105, and/or POI data records 1107 to support localization or video odometry based on the features stored therein and the generated parametric representations of lane lines of the records 1109. In this way, the parametric representation records 1109 can also be associated with the characteristics or metadata of the corresponding record 1103, 1105, and/or 1107.

In one embodiment, the geographic database 105 can be maintained by the content provider 115 in association with the services platform 109 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 113) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 12:
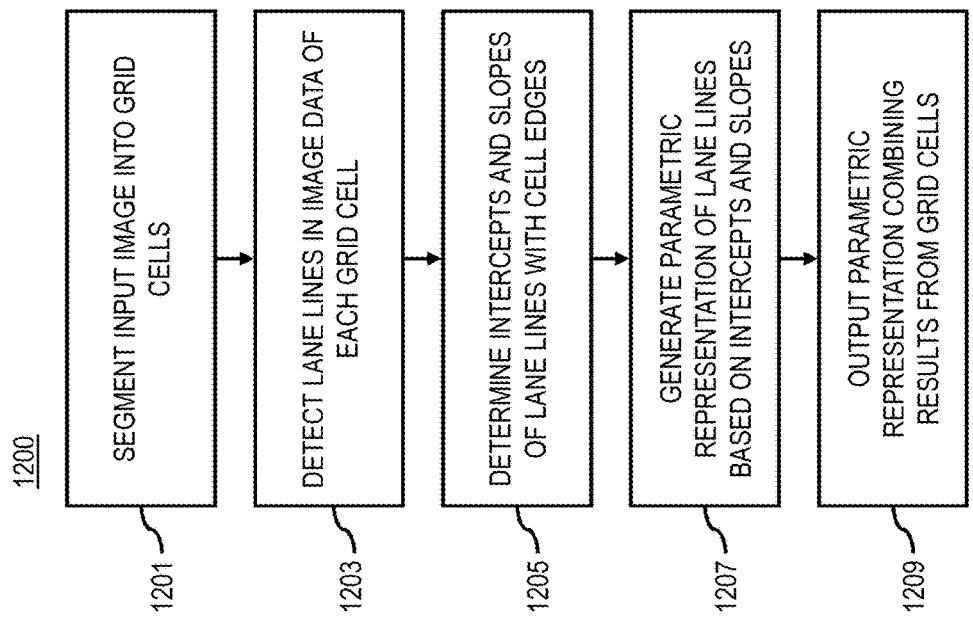
FIG. 12 is a flowchart of a process for generating a parametric representation of lane lines detected in an input image, according to one embodiment.
Figure 16:
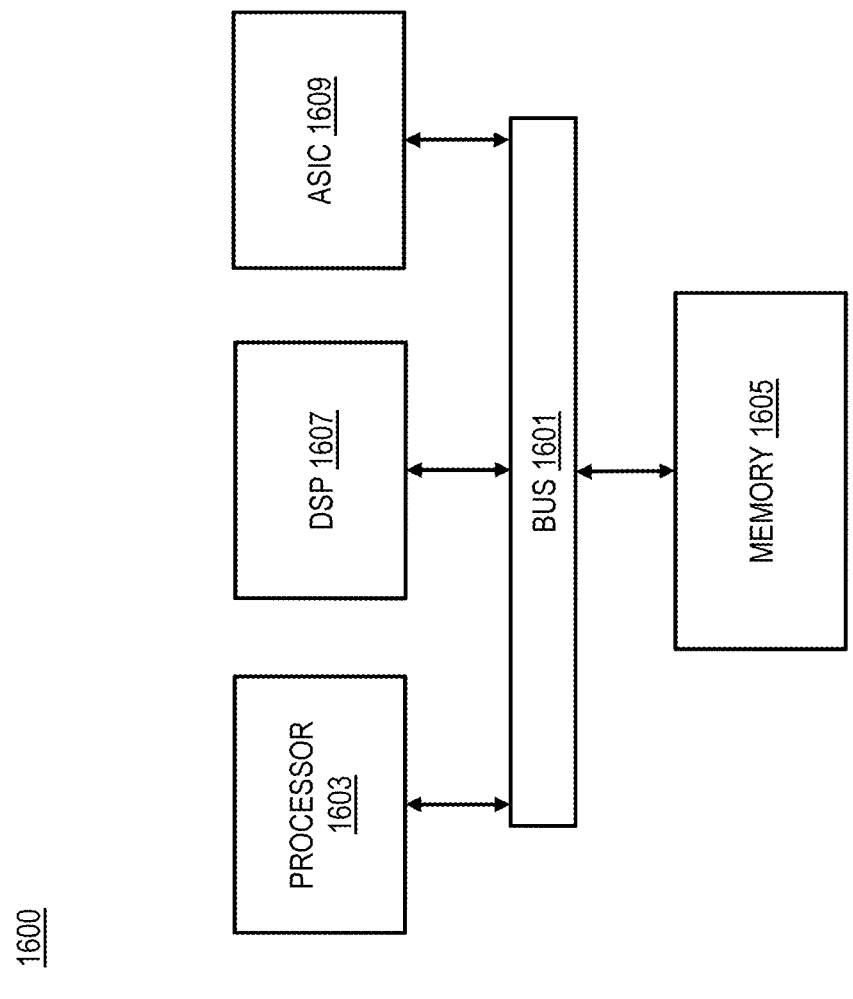
FIG. 16 is a diagram of a chip set that can be used to implement an embodiment of the invention.

FIG. 12 is a flowchart of a process for generating a parametric representation of lane lines detected in an input image, according to one embodiment. In one embodiment, the computer vision system 103 may perform one or more portions of the process 1200 and may be implemented in, for instance, a chip set including a processor and a memory as shown in FIG. 16. As such, the computer vision system 103 can provide means for accomplishing various parts of the process 1200. In addition or alternatively, the services platform 109 and/or services 111 may perform any combination of the steps of the process 1200 in combination with the computer vision system 103 or as standalone components. Although the process 1200 is illustrated and described as a sequence of steps, it is contemplated that various embodiments of the process 1200 may be performed in any order or combination and need not include all of the illustrated steps.

In step 1201, the computer vision system 103 segments an input image into a plurality of grid cells. As previously discussed, the input image can be part of an image capture stream (e.g., from an onboard camera of a vehicle 101) to support video odometry to more accurately localize the vehicle 101 (e.g., localized to within 10 cm accuracy). In one embodiment, the grid is comprised of regular shapes (e.g., square, rectangle, etc.), but it is contemplated that grid can also vary in size and/or shape from cell to cell. For example, in areas where higher resolution is needed (e.g., in the center of an image), smaller cells can be used to provide greater resolution. Similarly, larger cells can be used for the periphery of an image, where greater resolution may not be needed.

In one embodiment, the resolution or size of the grid can vary with available processing power and/or desired accuracy/preciseness of the resulting lane models. As previously discussed, in one embodiment, the grid resolution is at a relatively low level (e.g., 50×38).

In step 1203, the computer vision system 103 processes a portion of the input image in each of the plurality of grid cells to detect one or more lane lines in said each grid cell. In one embodiment, the computer vision system 103 assigns the processing of said each grid cell or the generating of the parametric representation of said each grid cell to a different processing node of the computer vision system. For example, in a neural network, the portion of the image data falling within a grid cell represent the receptive field for a given collection of neurons. These neurons can then use machine learning to automatically detect lane lines within the image. In one embodiment, the computer vision system 103 comprises a convolutional neural network, and the generating of the parametric representation is completed in one forward pass of the convolutional neural network.

In step 1205, the computer vision system 103 determines one or more intercepts of the one or more lane lines with one or more edges of said each grid cell, and one or more slopes of the one or more lane lines at the one or more intercepts for said each grid cell in which the one or more lane lines are detected. In one embodiment, the center line of the detected lanes can be used to determine the edge intercepts and slopes for each grid cell. It is contemplated that the computer vision system 103 can use any coordinate system, measurement unit, and/or scale to define the intercepts and slopes of the line at the intercepts.

In step 1207, the computer vision system 103 generates a parametric representation of the one or more lane lines for said each grid cell, wherein the parametric representation encodes the one or more intercepts and the one or more slopes into a data structure for said each grid cell. In one embodiment, the parametric representation of the data structure includes: (1) an indicator value parameter for each of the one or more edges to indicate which of the one or more edges of said each grid cell the one or more intercepts cross, (2) a slope parameter to indicate a slope of the one or more lane lines at the one or more intercepts, and/or (3) an intercept parameter to indicate a position along the one or more edges at which the one or more intercept occurs. In one embodiment, the indicator value parameter represents a probability that the one or more lanes is predicted to cross at the one or more intercepts when the computer vision system is operating in a prediction mode. One example of this data structure or parametric representation is discussed with respect to FIG. 6 above.

In one embodiment, the computer vision system 103 can optionally determine that there are a plurality of the one or more lane lines detected for said each grid cell. The computer vision system 103 then generates the parametric representation for each of the plurality of the one or more lane lines, and outputs the parametric representation for said each of the plurality of the one or more lane lines as a different set of output channels. In one embodiment, the computer vision system 103 can be configured with a maximum number of lane lines that it is to detect in a given grid cell. This maximum number can then be used to determine the number of output channels to allocate to the parametric representation. For example, in the example discussed above, a parametric representation of a line can have 12 parameters in one set to describe a single lane line. Accordingly, the number of output channels to allocate be the maximum number lane lines to detect multiplied by the number of parameters in a set.

In one embodiment, the parametric representation can be extended with additional classes and/or attributes to describe a detected lane line. For example, the parametric representation further includes an attribute parameter indicating a lane line type. This lane type can include a description class or attribute of the lane line such as whether the lane line is a solid lane line type or a dashed lane line type. In one embodiment, the lane type can be determined directly from the input image. For example, the computer vision system 103 can identify whether a lane consists of a solid line or a dashed line based on recognized visual features in the input image. In addition or alternatively, the lane type can be inferred or determined from the geographic database 105. For example, the computer vision system 103 can query the database to identify the lane type based on the current coordinates of the vehicle 101 (e.g., as determined from GPS, video odometry, and/or any other available localization technique).

In step 1209, the computer vision system 103 provides an output parametric representation for the input image, wherein the output parametric representation aggregates the parametric representations of said each grid cell. In other words, the computer vision system 103 can aggregate the parametric representation of lane lines in each grid cell into an output parametric representation that encompasses the entire input image. This collection of the basic representation units at the grid cells can then represent the overall geometry of lane lines or lane models.

Figure 13:
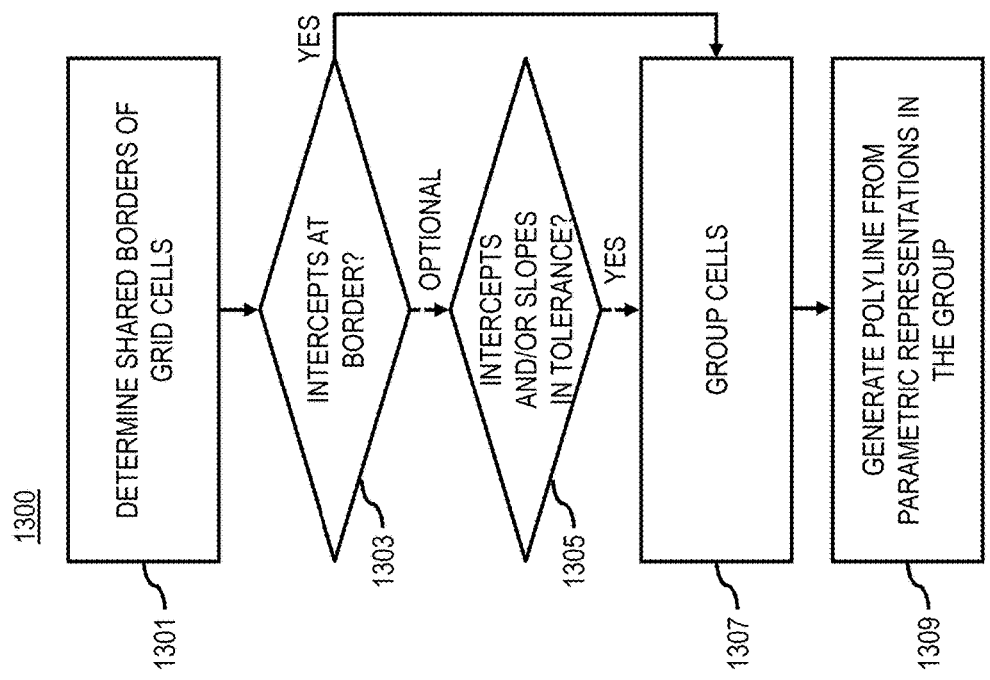
FIG. 13 is a flowchart of a process for grouping grid cells based on their respective parametric representations of lane lines, according to one embodiment.

FIG. 13 is a flowchart of a process for grouping grid cells based on their respective parametric representations of lane lines, according to one embodiment. In one embodiment, the computer vision system 103 may perform one or more portions of the process 1300 and may be implemented in, for instance, a chip set including a processor and a memory as shown in FIG. 16. As such, the computer vision system 103 can provide means for accomplishing various parts of the process 1300. In addition or alternatively, the services platform 109 and/or services 111 may perform any combination of the steps of the process 1300 in combination with the computer vision system 103 or as standalone components. Although the process 1300 is illustrated and described as a sequence of steps, it is contemplated that various embodiments of the process 1300 may be performed in any order or combination and need not include all of the illustrated steps.

In one embodiment, the process 1300 is performed following the creation of the parametric representations of at least some or all of the grid cells as described with respect to the process 1200 of FIG. 12.

In step 1301, the computer vision system 103 determines shared borders of grid cells. By way of example, a shared border of occurs at an edge of a first grid cell that is immediately adjacent or overlaps a corresponding edge of an adjacent second grid cell. Accordingly, in one embodiment, at each shared border of said each grid cell in the output parametric representation, the computer vision system 103 can look for cells with two edges with large indicator values (step 1303) and join the intercepts or simply group the cells (step 1307). For example, a "large indicator" value refers to a predicted or detected lane line for which the computer vision system 103 has predicted a probability of crossing the edge that is above a threshold probability. In other words, when two cells share a common border and each of the two cells has an intercept on the edge at the common border, then the two intercepts or cells can be joined into a common lane line if the indicator value is above the probability threshold.

In addition or alternatively, the computer vision system 103 combines two of said each grid cells (step 1307) when the one or more intercepts, the one or more slopes, a confidence value associated with the one or more intercepts, or a combination thereof for said two of said each grid cells are within a tolerance value (step 1305). In this embodiment, instead of relying on just the indicator value to join or group cells as discussed above, the computer vision system 103 can evaluate whether two adjacent intercepts occur at the same position along the shared border within a tolerance level (e.g., a threshold distance) and/or whether the slopes of the two intercepts also match to within a tolerance level (e.g., a threshold degree of variance). If the intercepts and/or slopes match within the tolerance level, then the intercepts or cells or joined into a group.

In one embodiment, a group of said each grid cells resulting from the combining represents a given lane line. In other words, the computationally cheap act of comparing intercepts and/or slopes at shared cell borders can result in building a lane model that advantageously does not require a fully connected layer of a neural network.

In step 1309, the computer vision system 103 processes the one or more lane lines detected in said each grid cell in the group to generate a polyline representing of a lane model of the given lane.

Figure 14:
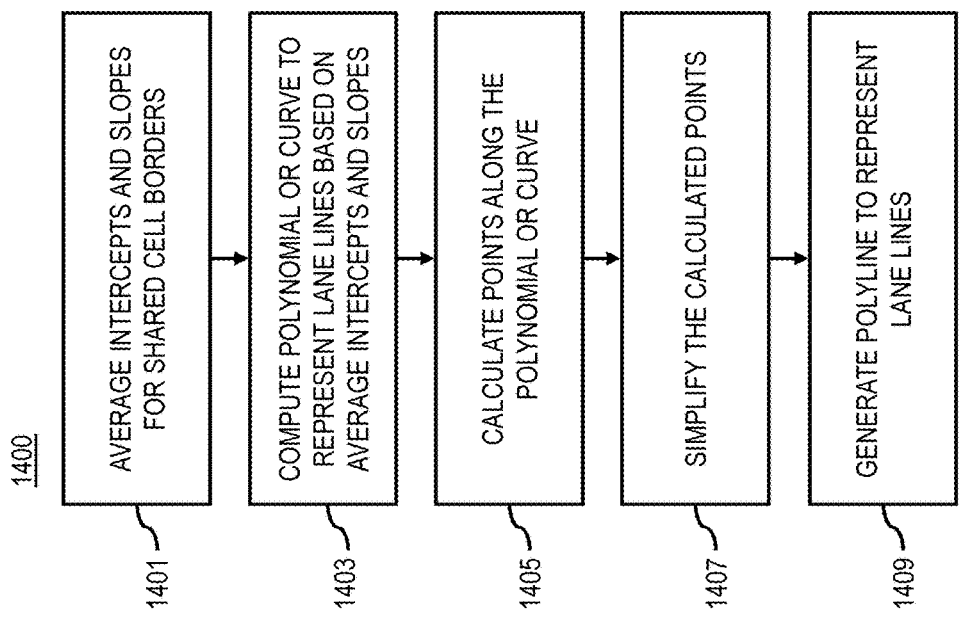
FIG. 14 is a flowchart for decoding parametric representations of lane lines into polylines, according to one embodiment.

FIG. 14 is a flowchart for decoding parametric representations of lane lines into polylines, according to one embodiment. In one embodiment, the computer vision system 103 may perform one or more portions of the process 1400 and may be implemented in, for instance, a chip set including a processor and a memory as shown in FIG. 16. As such, the computer vision system 103 can provide means for accomplishing various parts of the process 1400. In addition or alternatively, the services platform 109 and/or services 111 may perform any combination of the steps of the process 1400 in combination with the computer vision system 103 or as standalone components. Although the process 1400 is illustrated and described as a sequence of steps, it is contemplated that various embodiments of the process 1400 may be performed in any order or combination and need not include all of the illustrated steps.

The process 1400 describes an embodiment of a process for decoding grouped parametric representations of lane lines to generated lane models as described in step 1309 of the process 1300 above. Accordingly, in one embodiment, the process 1400 is performed following the process 1200 of FIG. 12 and the process 1300 of FIG. 13. One advantage of this decoding approach is that once a parametric representation of a lane line is generated for each grid cell, no further image analysis is needed to manipulate or otherwise decode the lane lines. This, in turn, results in a significant reduction of computational resources needed from create the lane models.

In step 1401, the processing of the one or more lane lines comprises averaging the one or more slopes, the one or more intercepts, or a combination thereof for said each shared border in the group. As previously discussed, the different intercept and slope results generated by each adjacent cell of shared border represents duplicate information of the detected lane line edge crossing. As a results, averaging the duplicate information or values can advantageously improve the accuracy of the predicted lane lines.

In step 1403, the computer vision system 103 determines a curvature of the one or more lane lines in said each grid cell based on an input slope and an output slope of the one or more slopes at the one or more intercepts. For example, there are typically two intercepts at two different edges or each grid cell in which a lane line is detected. These two intercepts and their respective slopes can be used to parametrically describe the shape of the lane line shape within the cell without actually have to store any data points about the line other than the intercepts and slope. In other words, no data from the interior of the grid cell is needed. Instead, the computer vision system 103 can compute a curve that encompasses the intercepts with the curvature based on the slopes of the intercepts. This curve can be based on computing, for instance, a Hermite polynomial, Bezier curve, and/or the like.

Once the curve is determined, the computer vision system 103 can initiate the process or converting the curve representations into a polyline or other vector-based representation of the lane lines. At step 1405, for instance, the computer vision system 103 uses the determined curves to calculate an excess number of points along the curve. As described above, the excess or large number points is a number that is greater than needed to as junction points of a polyline or vector-based representation of the lane line.

At step 1407, the computer vision system 103 can simplify the point representation of the lane lines by removing any points from the excess points that are not needed to delineate the polyline or vector-based representation to a predetermined accuracy and/or precision. This simplification process can be performed using any algorithm for simplifying curves such as the Ramer-Douglas-Peucker algorithm. The computer vision system 103 then uses the simplified point representation to generate the polyline or vector-based representation of the lane lines by connecting line segments between the remaining points with the remaining points acting as junction points. An example of the resulting polyline is illustrated in the example of FIG. 4A above.

The processes described herein for providing a parametric representation of lane lines may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 15:
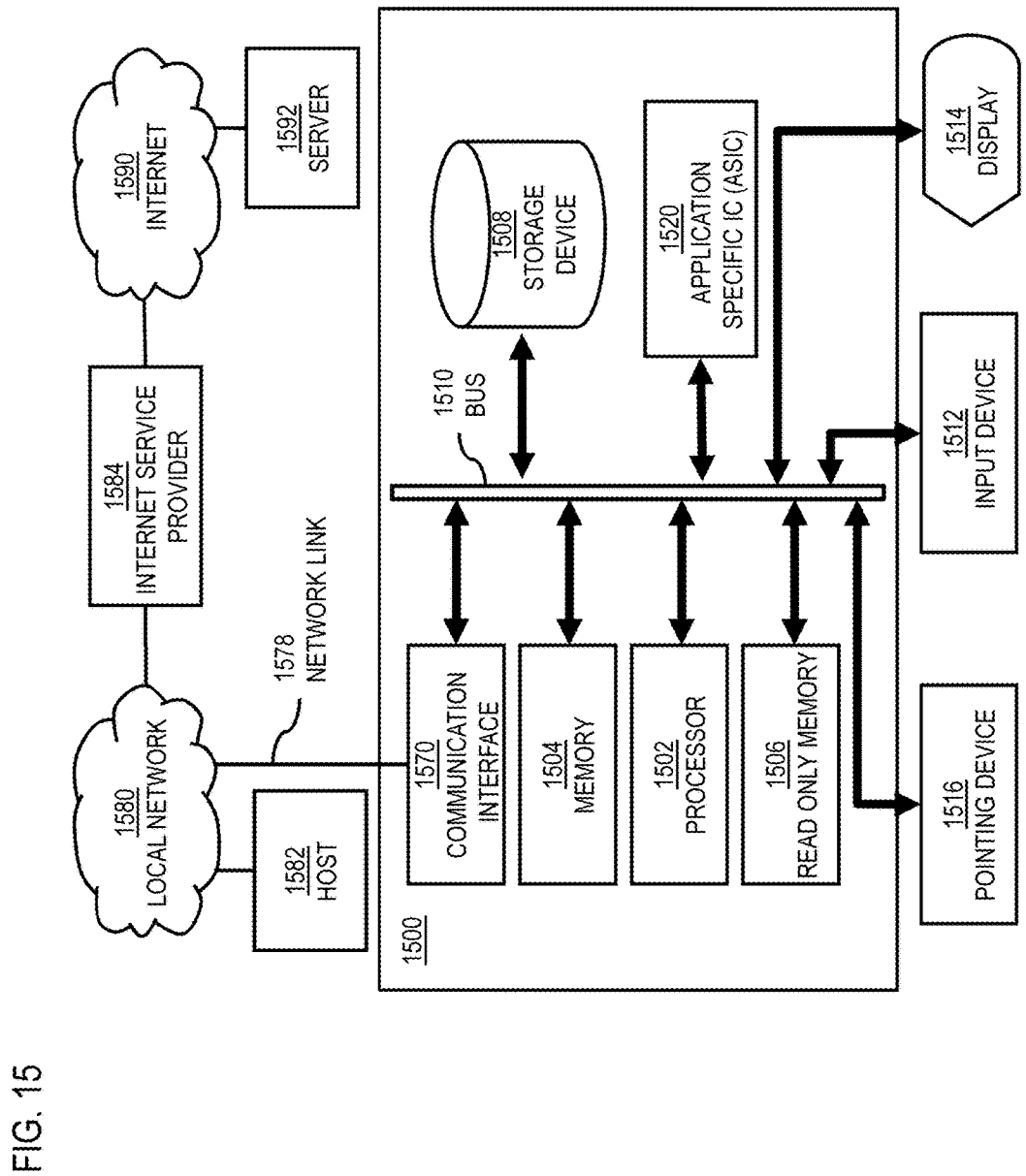
FIG. 15 is a diagram of hardware that can be used to implement an embodiment of the invention.

FIG. 15 illustrates a computer system 1500 upon which an embodiment of the invention may be implemented. Computer system 1500 is programmed (e.g., via computer program code or instructions) to provide a parametric representation of lane lines as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1510 includes one or more parallel conductors of information so that information is transferred quickly among devices coupled to the bus 1510. One or more processors 1502 for processing information are coupled with the bus 1510.

A processor 1502 performs a set of operations on information as specified by computer program code related to providing a parametric representation of lane lines. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for providing a parametric representation of lane lines. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for providing a parametric representation of lane lines, is provided to the bus 1510 for use by the processor from an external input device 1512, such as a keyboard containing alphanumeric keys operated by a human user, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT) or a liquid crystal display (LCD), or plasma screen or printer for presenting text or images, and a pointing device 1516, such as a mouse or a trackball or cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection to the communication network 107 for providing a parametric representation of lane lines.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 16 illustrates a chip set 1600 upon which an embodiment of the invention may be implemented. Chip set 1600 is programmed to provide a parametric representation of lane lines as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to provide a parametric representation of lane lines. The memory 1605 also stores the data associated with or generated by the execution of the inventive steps.

Figure 17:
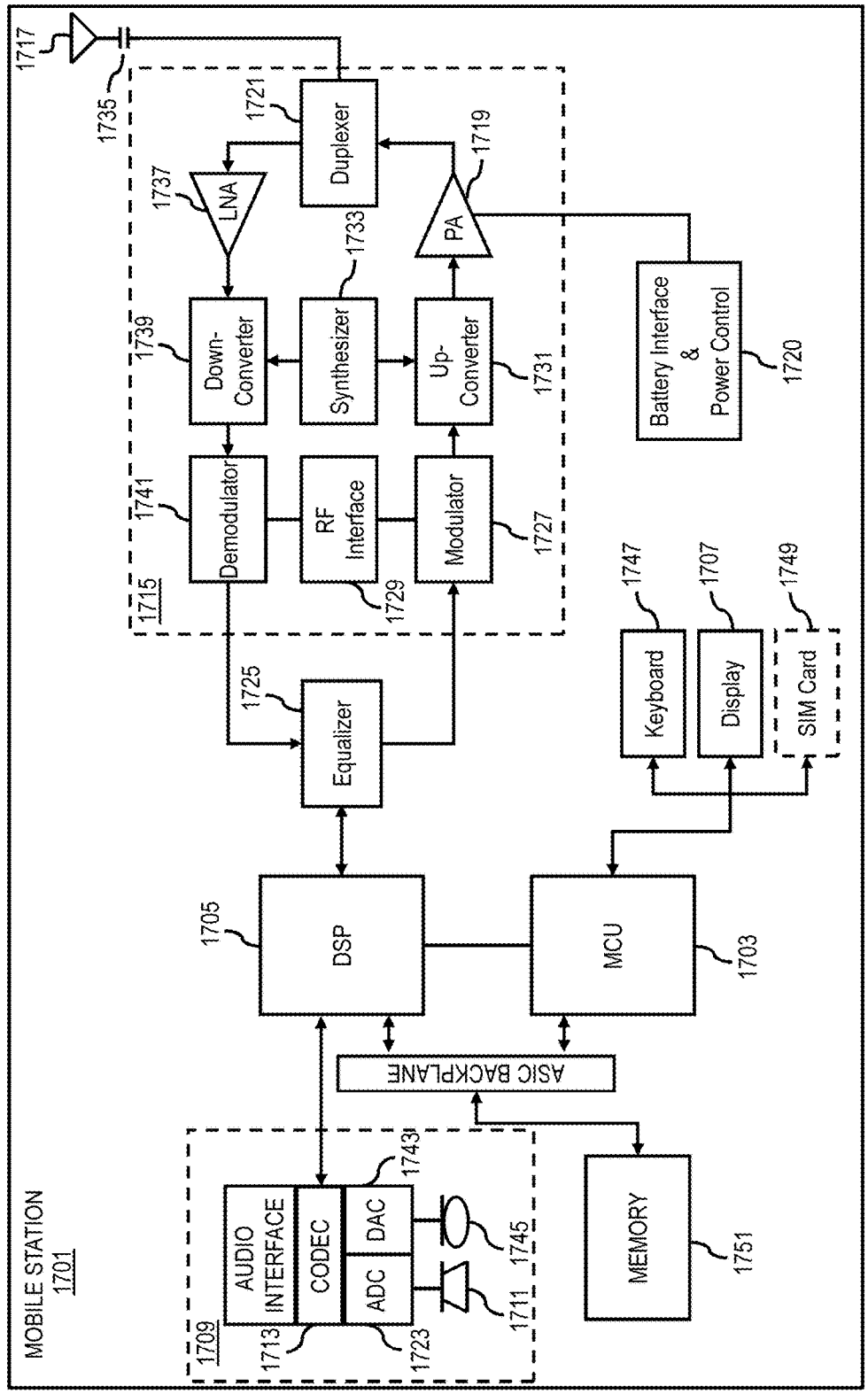
FIG. 17 is a diagram of a mobile terminal (e.g., handset) that can be used to implement an embodiment of the invention.

FIG. 17 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile station functions that offer automatic contact matching. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile station 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703—which can be implemented as a Central Processing Unit (CPU) (not shown).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile station 1701 to provide a parametric representation of lane lines. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the station. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile station 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1751 may be, but not limited to, a single memory, CD, DVD, ROM, RAM, EEPROM, optical storage, or any other non-volatile or non-transitory storage medium capable of storing digital data.

An optionally incorporated SIM card 1749 carries, for instance, important information, such as the cellular phone number, the carrier supplying service, subscription details, and security information. The SIM card 1749 serves primarily to identify the mobile station 1701 on a radio network. The card 1749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   segmenting, by a computer vision system, an input image into a plurality of grid cells, wherein each of the plurality of grid cells represents a portion of the input image;
   processing, by the computer vision system, portions of the input image in each of the plurality of grid cells to detect one or more lane lines in said each grid cell;
   for said each grid cell in which the one or more lane lines are detected, determining one or more intercepts of the one or more lane lines with one or more edges of said each grid cell, and one or more slopes of the one or more lane lines at the one or more intercepts;
   generating, by the computer vision system, a parametric representation of the one or more lane lines for said each grid cell, wherein the parametric representation encodes the one or more intercepts and the one or more slopes into a data structure for said each grid cell; and providing, by the computer vision system, an output parametric representation for the input image, wherein the output parametric representation aggregates the parametric representations of said each grid cell.

2. The method of claim 1, wherein the parametric representation includes:

an indicator value parameter for each of the one or more edges to indicate which of the one or more edges of said each grid cell the one or more intercepts cross;

a slope parameter to indicate a slope of the one or more lane lines at the one or more intercepts; and an intercept parameter to indicate a position along the one or more edges at which the one or more intercepts occur.

3. The method of claim 2, wherein the indicator value parameter represents a probability that the one or more lanes are predicted to cross at the one or more intercepts when the computer vision system is operating in a prediction mode.

4. The method of claim 2, wherein the parametric representation further includes an attribute parameter indicating a lane line type, and wherein the lane line type includes a solid lane line type or a dashed lane line type.

5. The method of claim 1, further comprising:

at each shared border of said each grid cell in the output parametric representation, combining two of said each grid cells when the one or more intercepts, the one or more slopes, a confidence value associated with the one or more intercepts, or a combination thereof for said two of said each grid cells are within a tolerance value, wherein a group of said each grid cells resulting from the combining represents a given lane line.

6. The method of claim 5, further comprising:

processing the one or more lane lines detected in said each grid cell in the group to generate a polyline representing a lane model of the given lane.

7. The method of claim 6, wherein the processing of the one or more lane lines comprises averaging the one or more slopes, the one or more intercepts, or a combination thereof for said each shared border in the group.

8. The method of claim 6, wherein the processing of the one or more lane lines comprises:

within said each grid cell of the group, computing a polynomial or a curve to represent the one or more lane lines detected within said each grid cell of the group;

calculating a plurality of points along the polynomial or the curve; and simplifying the plurality of points by removing a portion of the plurality of points, wherein the polyline representing the lane model is based on the simplified plurality of points.

9. The method of claim 1, further comprising:

determining a curvature of the one or more lane lines in said each grid cell based on an input slope and an output slope of the one or more slopes at the one or more intercepts.

10. The method of claim 1, further comprising:

determining that there is a plurality of the one or more lane lines detected for said each grid cell;

generating the parametric representation for each of the plurality of the one or more lane lines; and outputting the parametric representation for said each of the plurality of the one or more lane lines as a different set of output channels.

11. The method of claim 1, further comprising:

assigning the processing of said each grid cell or the generating of the parametric representation of said each grid cell to a different processing node of the computer vision system.

12. The method of claim 1, wherein the computer vision system comprises a convolutional neural network, and the generating of the parametric representation is completed in one forward pass of the convolutional neural network.

13. A non-transitory computer-readable storage medium, carrying one or more sequences of one or more instructions which, when executed by one or more processors, cause an apparatus to perform:

segmenting, by a computer vision system, an input image into a plurality of grid cells, wherein each of the plurality of grid cells represents a portion of the input image;

processing, by the computer vision system, portions of the input image in each of the plurality of grid cells to detect one or more lane lines in said each grid cell;

for said each grid cell in which the one or more lane lines are detected, determining one or more intercepts of the one or more lane lines with one or more edges of said each grid cell, and one or more slopes of the one or more lane lines at the one or more intercepts;

generating, by the computer vision system, a parametric representation of the one or more lane lines for said each grid cell, wherein the parametric representation encodes the one or more intercepts and the one or more slopes into a data structure for said each grid cell; and providing, by the computer vision system, an output parametric representation for the input image, wherein the output parametric representation aggregates the parametric representations of said each grid cell.

14. The non-transitory computer-readable storage medium of claim 13, wherein the parametric representation includes:

an indicator value parameter for each of the one or more edges to indicate which of the one or more edges of said each grid cell the one or more intercepts cross;

a slope parameter to indicate a slope of the one or more lane lines at the one or more intercepts; and an intercept parameter to indicate a position along the one or more edges at which the one or more intercepts occur.

15. The non-transitory computer-readable storage medium of claim 13, wherein the apparatus is further caused to perform:

at each shared border of said each grid cell in the output parametric representation, combining two of said each grid cells when the one or more intercepts, the one or more slopes, a confidence value associated with the one or more intercepts, or a combination thereof for said two of said each grid cells are within a tolerance value, wherein a group of said each grid cells resulting from the combining represents a given lane line.

16. The non-transitory computer-readable storage medium of claim 15, wherein the apparatus is further caused to perform:

processing the one or more lane lines detected in said each grid cell in the group to generate a polyline representing a lane model of the given lane, wherein the processing of the one or more lane lines comprises averaging the one or more slopes, the one or more intercepts, or a combination thereof for said each shared border in the group.

17. An apparatus comprising:
at least one processor; and
at least one memory including computer program code for one or more programs,
the at least one memory and the computer program code configured to, with the at least one processor, cause the apparatus to perform at least the following,
segment an input image into a plurality of grid cells, wherein each of the plurality of grid cells represents a portion of the input image;
process portions of the input image in each of the plurality of grid cells to detect one or more lane lines in said each grid cell;
for said each grid cell in which the one or more lane lines are detected, determine one or more intercepts of the one or more lane lines with one or more edges of said each grid cell, and one or more slopes of the one or more lane lines at the one or more intercepts;
generate a parametric representation of the one or more lane lines for said each grid cell, wherein the parametric representation encodes the one or more intercepts and the one or more slopes into a data structure for said each grid cell; and
provide an output parametric representation for the input image, wherein the output parametric representation aggregates the parametric representations of said each grid cell.

18. The apparatus of claim 17, wherein the parametric representation includes:
an indicator value parameter for each of the one or more edges to indicate which of the one or more edges of said each grid cell the one or more intercepts cross;
a slope parameter to indicate a slope of the one or more lane lines at the one or more intercepts; and
an intercept parameter to indicate a position along the one or more edges at which the one or more intercepts occur.

19. The apparatus of claim 17, wherein the apparatus is further caused to:
at each shared border of said each grid cell in the output parametric representation, combine two of said each grid cells when the one or more intercepts, the one or more slopes, a confidence value associated with the one or more intercepts, or a combination thereof for said two of said each grid cells are within a tolerance value,
wherein a group of said each grid cells resulting from the combining represents a given lane line.

20. The apparatus of claim 17, wherein the apparatus is further caused to:
process the one or more lane lines detected in said each grid cell in the group to generate a polyline representing a lane model of the given lane,
wherein the processing of the one or more lane lines comprises averaging the one or more slopes, the one or more intercepts, or a combination thereof for said each shared border in the group.

\* \* \* \* \*